(12) United States Patent
Bagaini et al.

(10) Patent No.: US 10,884,146 B2
(45) Date of Patent: Jan. 5, 2021

(54) SEISMIC SENSOR ORIENTATION

(71) Applicant: SCHLUMBERGER TECHNOLOGY CORPORATION, Sugar Land, TX (US)

(72) Inventors: Claudio Bagaini, Cottenham (GB); Daniele Boiero, Kent (GB)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 334 days.

(21) Appl. No.: 15/765,465

(22) PCT Filed: Oct. 4, 2016

(86) PCT No.: PCT/US2016/055239
§ 371 (c)(1),
(2) Date: Apr. 2, 2018

(87) PCT Pub. No.: WO2017/062322
PCT Pub. Date: Apr. 13, 2017

(65) Prior Publication Data
US 2018/0306937 A1 Oct. 25, 2018

Related U.S. Application Data

(60) Provisional application No. 62/238,275, filed on Oct. 7, 2015.

(51) Int. Cl.
G01V 1/30 (2006.01)
G01V 1/28 (2006.01)

(52) U.S. Cl.
CPC ............ *G01V 1/30* (2013.01); *G01V 1/282* (2013.01); *G01V 1/284* (2013.01);
(Continued)

(58) Field of Classification Search
CPC .......... G01V 1/30; G01V 1/284; G01V 1/282; G01V 2210/1423; G01V 2210/1425;
(Continued)

(56) References Cited

U.S. PATENT DOCUMENTS 6,205,403 B1  3/2001  Gaiser et al.
7,050,355 B2  5/2006  Robertsson et al.
(Continued)

FOREIGN PATENT DOCUMENTS

GB    2379505 A      3/2003
WO    02073239 A1   9/2002

OTHER PUBLICATIONS

Zeng et al., Two Methods for Determining Geophone Orientations from VSP Data, Jul.-Aug. 2006, Geophysics, vol. 71, No. 4, pp. V87-V9 (Year: 2006).*
(Continued)

*Primary Examiner* — Toan M Le
(74) *Attorney, Agent, or Firm* — Michael Guthrie

(57) ABSTRACT

A method can include receiving information associated with an interface between a first medium and a second medium where the information includes sensor data; based on at least a portion of the information, estimating wave properties that include elastic properties, depth-dependent properties and horizontal slowness; and, based on the estimated wave properties, calculating an orientation of a sensor utilized to acquire at least a portion of the sensor data.

15 Claims, 12 Drawing Sheets

(52) U.S. Cl.
CPC ............... *G01V 2210/144* (2013.01); *G01V 2210/1423* (2013.01); *G01V 2210/1425* (2013.01); *G01V 2210/1427* (2013.01); *G01V 2210/1429* (2013.01); *G01V 2210/161* (2013.01); *G01V 2210/165* (2013.01); *G01V 2210/614* (2013.01); *G01V 2210/622* (2013.01); *G01V 2210/626* (2013.01)

(58) Field of Classification Search
CPC ... G01V 2210/1427; G01V 2210/1429; G01V 2210/144; G01V 2210/161; G01V 2210/165; G01V 2210/614; G01V 2210/622; G01V 2210/626
See application file for complete search history.

(56) References Cited

U.S. PATENT DOCUMENTS

| | | |
|---|---|---|
| 2005/0018537 A1 | 1/2005 | Welker et al. |
| 2010/0102820 A1 | 4/2010 | Martinez et al. |
| 2010/0246322 A1 | 9/2010 | Welker |
| 2013/0028050 A1 | 1/2013 | Ozdemir et al. |
| 2014/0140171 A1 | 5/2014 | Sollner |

OTHER PUBLICATIONS

Extended Search Report issued in the related EP Application 16854149.8, dated Jul. 1, 2019 (11 pages).
Charles Sicking et al., "Elastic modeling-based three-component VSP coordinate reorientation", SEG Technical Program Expanded Abstracts 2016, Sep. 1, 2016, pp. 5628-5632.
Giovanni Mennano et al., "Borehole receiver orientation using a 3D velocity model", Geophysical Prospecting, vol. 61, Jan. 1, 2013, pp. 215-230.
Schalkwijk K. M. et al., "Application of Two-Step Decomposition to Multicomponent Ocean-Bottom Data: Theory and Case Study" Journal of Seismic Exlora, Geophyiscal Press, Castelnau-Le-Nez, GB, vol. 8, No. 8, Jan. 1, 1999, pp. 261-278.
Kragh et al., 2004, Vector Fidelity Characterization of a Marine Multi-Component Acquisition System, EAGE 66th Annual Conference & Exhibition—Paris, France, Jun. 7-10, 2004 (4 pages).
Boiero, et al., "Surface- and guided-wave inversion for near-surface modeling in land and shallow marine seismic data," The Leading Edge, Jun. 2013, vol. 32, pp. 638-646.
Chapman, "Fundamentals of Seismic Wave Propagation," Cambridge University Press, ISBN 978-0-521-81538-3, 2004. 634 pp.
Dellinger, et al., "Horizontal vector infidelity correction by general linear transform," 71st Ann. International Meeting., Society of Exploration Geophysics, pp. 865-868, 2001.
Gaiser, "Applications for vector coordinate systems of 3-D converted wave data," The Leading Edge, vol. 18, pp. 1290-1300, 1999.
Kanasewich, "Time sequence analysis in geophysics," University of Alberta Press, Edmonton, 1981. 198 pp.
Krieger, et al., "Optimal reorientation of geophysical sensors: a quaternion-based analytical solution," Geophysics, vol. 80, 2015, pp. F19-F30.
Rajan, et al., "Modal inverse techniques for inferring geoacoustic properties in shallow water," Important elements in: Geoacoustic Inversion, Signal Processing, and Reverberation in Underwater Acoustics, 2008, pp. 165-234.
Shtivelman, "Estimating shear wave velocities below the sea bed using surface waves," Near Surface Geophysics, vol. 2, pp. 241-247, 2004.
Strobbia, et al., "Surface waves: use them then lose them," Surface-wave analysis, inversion and attenuation in land reflection seismic surveying, Near Surface Geophysics, vol. 9, pp. 503-514.
International Search Report and Written Opinion for the equivalent International patent application PCT/US2016/055239 dated Jan. 20, 2017.
Chapman, Rays at an Interface, Chapter 6, Fundamentals of Seismic Wave Propagation, Jan. 1, 2004, Cambridge University Press, ISBN 978-0-521-81538-3, pp. 198-377.
Office Action issued in the related EP Application 16854149.8, dated Jan. 1, 2020 (7 pages).
International Preliminary Report on Patentability for the equivalent International patent application PCT/US2016/055239 dated Apr. 19, 2018.

* cited by examiner

SEISMIC SENSOR ORIENTATION

RELATED APPLICATIONS

This application claims priority to and the benefit of a U.S. Provisional Application having Ser. No. 62/238,275, filed 7 Oct. 2015, which is incorporated by reference herein.

BACKGROUND

Seismology can include positioning receivers in an environment. As an example, a receiver can include one or more sensors. As an example, a receiver can include different types of sensors such as, for example, a pressure type of sensor and a motion type of sensor.

SUMMARY

A method can include receiving information associated with an interface between a first medium and a second medium where the information includes sensor data; based on at least a portion of the information, estimating wave properties that include elastic properties, depth-dependent properties and horizontal slowness; and, based on the estimated wave properties, calculating an orientation of a sensor utilized to acquire at least a portion of the sensor data. A system can include a processor; memory operatively coupled to the processor; and processor-executable instructions stored in the memory to instruct the system to: receive information associated with an interface between a first medium and a second medium where the information includes sensor data; based on at least a portion of the information, estimate wave properties that include elastic properties, depth-dependent properties and horizontal slowness; and based on the estimated wave properties, calculate an orientation of a sensor utilized to acquire at least a portion of the sensor data. One or more computer-readable storage media can include processor-executable instructions to instruct a computing system to: receive information associated with an interface between a first medium and a second medium where the information includes sensor data; based on at least a portion of the information, estimate wave properties that include elastic properties, depth-dependent properties and horizontal slowness; and based on the estimated wave properties, calculate an orientation of a sensor utilized to acquire at least a portion of the sensor data. Various other apparatuses, systems, methods, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

DETAILED DESCRIPTION

The following description includes the best mode presently contemplated for practicing the described implementations. This description is not to be taken in a limiting sense, but rather is made merely for the purpose of describing the general principles of the implementations. The scope of the described implementations should be ascertained with reference to the issued claims.

Seismology finds use in geophysics, for example, to estimate properties of subsurface formations. As an example, seismology may provide seismic data representing waves of elastic energy (e.g., as transmitted by P-waves and S-waves, in a frequency range of approximately 1 Hz to approximately 100 Hz). Seismic data may be processed and interpreted, for example, to understand better composition, fluid content, extent and geometry of subsurface rocks. As an example, a receiver may operate at a frequency, over a range of frequencies, etc.

As an example, a receiver may operate according to a Nyquist condition or conditions (e.g., a Nyquist frequency or frequencies). For example, to reduce risk of aliasing, individual constituent frequencies may be sampled at least two times per wavelength. A Nyquist frequency can be defined as half of the sampling frequency of a digital recording system. As an example, a receiver may sample at about 1000 Hz (e.g., one sample per ms), at about 500 Hz (e.g., one sample per 2 ms), at about 250 Hz (e.g., one sample per 4 ms), etc.

As an example, a method can include acquiring seismic data using a receiver to determine one or more spatial characteristics of an environment. In such an example, the method may be applied to a geologic environment using sources disposed in/on land and/or may be applied to a geologic environment using sources disposed in/on water. As an example, a borehole may be a land-based borehole or a sea bed borehole. As an example, positions of sources may be one or more of land-based and sea-based.

Figure 1:
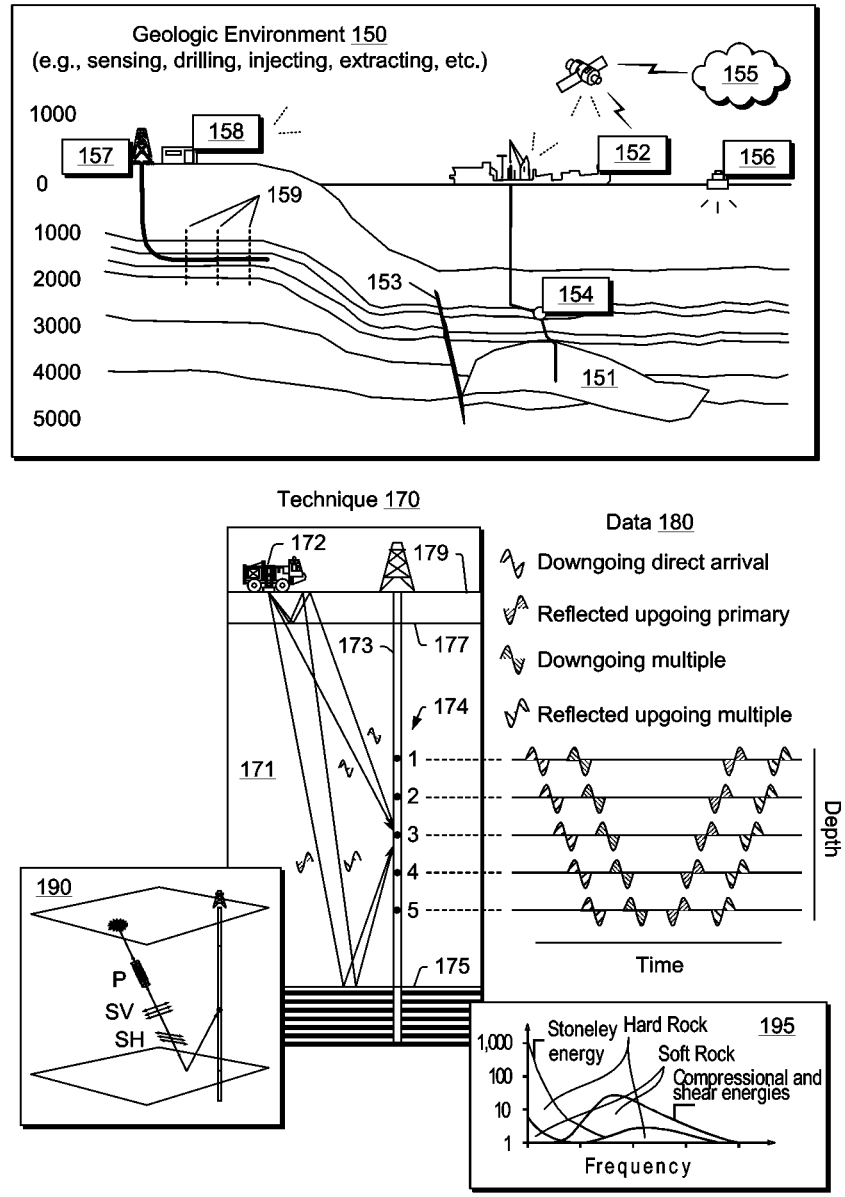
FIG. 1 illustrates an example of a geologic environment and an example of a technique.

FIG. 1 shows an example of a geologic environment 150 (e.g., an environment that includes a sedimentary basin, a reservoir 151, one or more fractures 153, etc.) and an example of an acquisition technique 170 to acquire seismic data. As an example, a system may process data acquired by the technique 170, for example, to allow for direct or indirect management of sensing, drilling, injecting, extracting, etc., with respect to the geologic environment 150. In turn, further information about the geologic environment 150 may become available as feedback (e.g., optionally as input to the system).

As an example, a system may include features of a commercially available simulation framework such as the PETREL® seismic to simulation software framework (Schlumberger Limited, Houston, Tex.). The PETREL® framework provides components that allow for optimization of exploration and development operations. The PETREL® framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes. Such a framework may be considered an application and may be considered a data-driven application (e.g., where data is input for purposes of simulating a geologic environment).

As an example, a system may include add-ons or plug-ins that operate according to specifications of a framework environment. For example, a commercially available framework environment marketed as the OCEAN® framework environment (Schlumberger Limited, Houston, Tex.) allows for integration of add-ons (or plug-ins) into a PETREL® framework workflow. The OCEAN® framework environment leverages .NET® tools (Microsoft Corporation, Redmond, Wash.) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

In the example of FIG. 1, the geologic environment 150 may include layers (e.g., stratification) that include a reservoir 151 and that may be intersected by a fault 153. As an example, a geologic environment may be or include an offshore geologic environment, a seabed geologic environment, an ocean bed geologic environment, etc.

As an example, the geologic environment 150 may be outfitted with any of a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156 may be located remote from a well site and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 155 that may be configured for communications, noting that the satellite may additionally or alternatively include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop the reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

As an example, a system may be used to perform one or more workflows. A workflow may be a process that includes a number of worksteps. A workstep may operate on data, for example, to create new data, to update existing data, etc. As an example, a system may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable in the PETREL® software, for example, that operates on seismic data, seismic attribute(s), etc. As an example, a workflow may be a process implementable in the OCEAN® framework. As an example, a workflow may include one or more worksteps that access a module such as a plug-in (e.g., external executable code, etc.).

In FIG. 1, the technique 170 may be implemented with respect to a geologic environment 171. As shown, an energy source (e.g., a transmitter) 172 may emit energy where the energy travels as waves that interact with the geologic environment 171. As an example, the geologic environment 171 may include a bore 173 (e.g., a borehole) where one or more sensors (e.g., receivers) 174 may be positioned in the bore 173. As an example, energy emitted by the energy source 172 may interact with a layer (e.g., a structure, an interface, etc.) 175 in the geologic environment 171 such that a portion of the energy is reflected, which may then be sensed by one or more of the sensors 174. Such energy may be reflected as an upgoing primary wave (e.g., or "primary"). As an example, a portion of emitted energy may be reflected by more than one structure in the geologic environment and referred to as a multiple reflected wave (e.g., or "multiple"). For example, the geologic environment 171 is shown as including a layer 177 that resides below a surface layer 179. Given such an environment and arrangement of the source 172 and the one or more sensors 174, energy may be sensed as being associated with particular types of waves.

As shown in FIG. 1, acquired data 180 can include data associated with downgoing direct arrival waves (e.g., first direct arrival waves, first arrival waves, first direct waves, etc.), reflected upgoing primary waves, downgoing multiple reflected waves and reflected upgoing multiple reflected waves. The acquired data 180 is also shown along a time axis and a depth axis. As indicated, in a manner dependent at least in part on characteristics of media in the geologic environment 171, waves travel at velocities over distances such that relationships may exist between time and space. Thus, time information, as associated with sensed energy, may allow for understanding spatial relations of layers, interfaces, structures, etc. in a geologic environment.

FIG. 1 also shows a plot 190 of various types of waves as including P, SV an SH waves. As an example, a P-wave may be an elastic body wave or sound wave in which particles oscillate in the direction the wave propagates and may be referred to as a compressional wave (e.g., compressional energy). As an example, P-waves incident on an interface (e.g., at other than normal incidence, etc.) may produce reflected and transmitted S-waves (e.g., "converted" waves). As an example, an S-wave or shear wave may be an elastic body wave, for example, in which particles oscillate perpendicular to the direction in which the wave propagates. S-waves may be generated by a seismic energy sources (e.g., other than an air gun). FIG. 1 also shows a plot 195 of approximate amplitudes (e.g., in millivolts for a particular type of receiver) and frequencies for various types of energy and approximate types of rock (e.g., "hard" rock and "soft" rock).

As an example, a source may be, for example, a horizontal vibroseis source. As an example, an airgun source and/or a dynamite source may generate shear waves depending on surface conditions. As an example, S-waves may be converted to P-waves. S-waves tend to travel more slowly than P-waves and do not travel through fluids that do not support shear. In general, recording of S-waves involves use of one or more receivers operatively coupled to earth (e.g., capable of receiving shear forces with respect to time). As an example, interpretation of S-waves may allow for determination of rock properties such as fracture density and orientation, Poisson's ratio and rock type, for example, by crossplotting P-wave and S-wave velocities, and/or by other techniques.

As an example of parameters that can characterize anisotropy of media (e.g., seismic anisotropy), consider the Thomsen parameters ε, δ and γ. The Thomsen parameter δ can be interpreted as describing depth (e.g., actual depth) and seismic depth. As to the Thomsen parameter ε, it describes a difference between vertical and horizontal compressional waves (e.g., P or P-wave or quasi compressional wave qP or qP-wave). As to the Thomsen parameter γ, it describes a difference between horizontally polarized and vertically polarized shear waves (e.g., horizontal shear wave SH or SH-wave and vertical shear wave SV or SV-wave or quasi vertical shear wave qSV or qSV-wave). Thus, the Thomsen parameters ε and γ may be estimated from wave data while estimation of the Thomsen parameter δ involves access to additional information.

As an example, seismic data may be acquired for a region in the form of traces. As an example, a trace may include a waveform (e.g., values of amplitude of energy versus time), for example, as sampled via a receiver. In the example of FIG. 1, the technique 170 may include the source 172 for emitting energy where portions of such energy (e.g., directly and/or reflected) may be received via the one or more sensors 174. As an example, energy received may be discretized by an analog-to-digital converter that operates at a sampling rate that may output values at a sample output rate (e.g., a sample output rate may differ from a sampling rate). For example, acquisition equipment may convert energy signals sensed by a sensor to digital samples at a rate of one sample per approximately 4 ms (e.g., for purposes of storage, transmission, etc.); noting that such an example may correspond to a sampling rate of about 250 Hz (e.g., about $(0.004\text{ s})^{-1}$). Given a speed of sound in a medium or media, a sample output rate may be converted to an approximate distance. For example, the speed of sound in rock may be of the order of around 5 km per second. Thus, a sample time spacing of approximately 4 ms would correspond to a sample "depth" spacing of about 10 meters (e.g., assuming a path length from source to boundary and boundary to sensor). As an example, a trace may be about 4 seconds in duration; thus, for a sample output rate of one sample at about 4 ms intervals, such a trace would include about 1000 sample values where latter acquired sample values correspond to deeper reflection boundaries. If the 4 second trace duration of the foregoing example is divided by two (e.g., to account for reflection), for a vertically aligned source and sensor, the deepest boundary depth may be estimated to be about 10 km (e.g., assuming a speed of sound of about 5 km per second).

As an example, equipment can include one or more hydrophones and/or one or more geophones. A hydrophone can be employed for detecting seismic energy in the form of pressure changes, for example, under water during marine seismic acquisition. As an example, a plurality of hydrophones can be coupled to form one or more streamers. As an example, a streamer may be deployed by towing from a vessel or, for example, deployed via cable (e.g., wireline) in a borehole.

As an example, a geophone can be employed for seismic acquisition, for example, onshore or on a seabed (e.g., offshore). A geophone can detect motion such as ground velocity produced by seismic waves. A geophone can include circuitry that transforms detected motion into electrical impulses. As an example, a geophone may be directional, for example, defined by an axis. In such an example, a geophone may detect motion along a direction (e.g., an axial direction). As an example, a seismic survey on land may employ one geophone per receiver location to detect motion in a vertical direction. As an example, three mutually orthogonal geophones may be employed to acquire three-component (3C) seismic data.

As an example, equipment that includes a hydrophone can include circuitry that process pressure signals. As an example, equipment that includes a geophone can include circuitry that process motion signals. As an example, equipment that includes at least one hydrophone and at least one geophone can include circuitry that processes pressure signals and circuitry that processes motion signals.

As an example, equipment may include circuitry to acquire four-component (4C) seismic data, which may be, for example, borehole or marine seismic data. For example, consider data acquired using three orthogonally-oriented geophones and a hydrophone (e.g., within an ocean-bottom sensor, etc., optionally deployed in a node-type system, a cable system, etc.). Where equipment can be in contact with a formation such as, for example, a seabed or a borehole wall, geophones may be employed to measure shear waves (S-waves); whereas, a hydrophone can be employed to measure compressional waves (P-waves).

Figure 2:
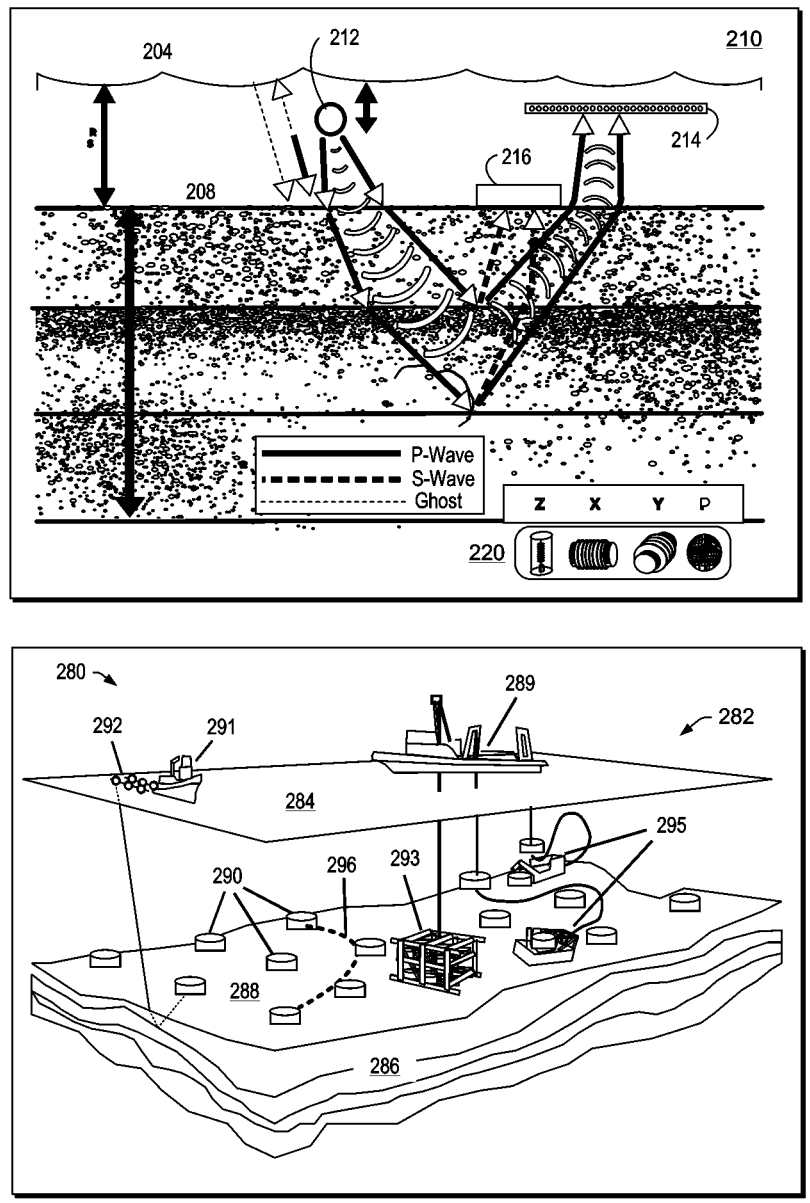
FIG. 2 illustrates an example of a survey in a marine environment and an example of a system.

FIG. 2 shows an example of a survey 210 and an example of a survey 280. In the example survey 210, a source 212 is positioned in water at a source depth from a water surface 204 where a water depth exists between the water surface 204 and an ocean floor surface 208 (e.g., seabed surface) and, in the example survey 210, receivers include streamer receivers 214 and ocean floor receivers 216. As an example, a receiver may be a multicomponent receiver that includes multiple components 220 (e.g., three-axis motion sensors and a pressure sensor). As illustrated in the survey 210, the streamer receivers 214 can acquire compressional wave information (P-wave) and the ocean floor receivers 216 can acquire shear wave information (S-wave). As shown in the survey, ghosts may be generated, for example, due at least in part to reflection of energy from an air/water interface (e.g., the sea surface). As an example, the ocean floor receivers 216 (e.g., seafloor or seabed receivers) may provide for acquiring information as to S-waves (e.g., via one or more geophones). As an example, the ocean floor receivers 216 may provide for acquiring information as to P-waves and/or information as to S-waves. As an example, a geophone may be employed to measure ground motion and, for example, direction of arrival of a P-wave.

As to the example survey 280 of FIG. 2, a geologic environment 282 is illustrated that includes an air-water surface 284 (e.g., an air-fluid interface), a formation 286 and a seabed 288 where nodes 290 are positioned on the seabed 284 (e.g., according to a grid such as, for example, an x, y grid in a Cartesian coordinate system). As an example, equipment may be utilized to position the nodes 290 on the seabed 284 and retrieve the nodes 290 from the seabed 284. Such equipment may include one or more vessels 289, one or more carriers 293 and one or more vehicles 295, which may be autonomous, semi-autonomous, etc. (e.g., remotely operated vehicles (ROVs), etc.). As an example, a system can include a seismic source vessel 291 that includes one or more seismic sources 292. The seismic source vessel 291 may travel a path while, at times, emitting seismic energy from the one or more sources 292. In such an example, the nodes 290 can receive portions of the seismic energy, which can include portions that have travelled through the formation 286. As an example, analysis of received seismic energy by the nodes 290 may reveal features of the formation 286.

As an example, the one or more sources 292 may be an air gun or air gun array (e.g., a source array). As an example, a source can produce a pressure signal that propagates through water into a formation where acoustic and elastic waves are formed through interaction with features (e.g., structures, fluids, etc.) in the formation. Acoustic waves can be characterized by pressure changes and a particle displacement in a direction of which the acoustic wave travels. Elastic waves can be characterized by a change in local stress in material and a particle displacement. Acoustic and elastic waves may be referred to as pressure and shear waves, respectively; noting that shear waves may not propagate in water. Collectively, acoustic and elastic waves may be referred to as a seismic wavefield.

Material in a formation may be characterized by one or more physical parameters such as, for example, density, compressibility, and porosity. In the geologic environment 282 of FIG. 2, energy emitted from the one or more sources 292 can be transmitted to the formation 286; however, elastic waves that reach the seabed 288 will not propagate back into the water. In such an example, such elastic waves may be received by sensors of the nodes 290. For example, the nodes 290 can include motion sensors that can measure one or more of displacement, velocity and acceleration. As an example, a motion sensor may be a geophone, an accelerometer, etc. As to pressure waves, the nodes 290 can include pressure wave sensors such as, for example, hydrophones.

As an example, various nodes of the nodes 290 may optionally be coupled via a cable or cables 296. As an example, a cable may include one or more sensors. For example, a cable that extends from, to, between, etc., one or more nodes may optionally include one or more sensors that may include one or more geophones, one or more hydrophones, etc.

As an example, the nodes 290 can include sensors for acquiring seismic wavefield information at the seabed 288. As an example, each of the nodes 390 can include one or more hydrophones and/or one or more motion sensors (e.g., one or more geophones, one or more accelerometers, etc.).

As an example, a node can include circuitry that can include circuitry that can digitize (e.g., analog to digital conversion ADC circuitry) and record signals (e.g., a microcontroller, a processor, etc., operatively coupled to memory). As an example, each of the nodes 290 can include a housing, sensors, one or more microcontrollers or processors, one or more batteries, memory, ADC circuitry, a compass, communication circuitry, etc. Various components of a node may be operatively coupled, for example, via wires, connectors, etc. As an example, a node can include one or more circuit boards (e.g., printed circuit boards) that can provide for electrical connections between various components, etc.

Figure 3:
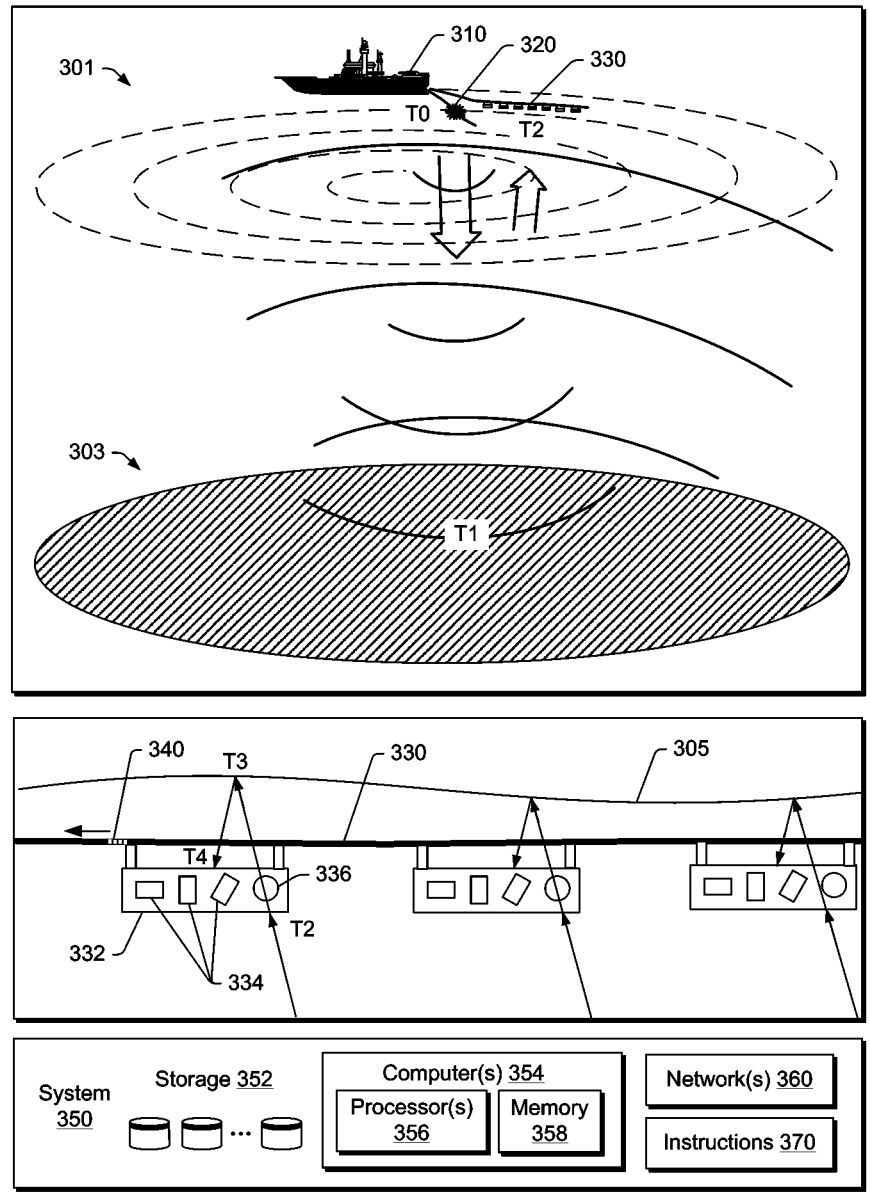
FIG. 3 illustrates an example of a geologic environment and examples of equipment.

FIG. 3 shows an example of a geologic environment 301 that includes a seabed 303 and a sea surface 305. As shown, equipment 310 such as a ship may tow an energy source 320 and a string of sensors 330 at a depth below the sea surface 305. In such an example, the energy source 320 may emit energy at a time T0, a portion of that energy may be reflected from the seabed 303 at a time T1 and a portion of that reflected energy may be received at the string of sensors 330 at a time T2.

As mentioned with respect to the technique 170 of FIG. 1, a wave may be a primary or a multiple. As shown in an enlarged view of the geologic environment 301, the sea surface 305 may act to reflect waves such that sensors 332 of the string of sensors 330 may sense multiples as well as primaries. In particular, the sensors 332 may sense so-called sea surface multiples, which may be multiples from primaries or multiples of multiples (e.g., due to sub-seabed reflections, etc.).

As an example, each of the sensors 332 may sense energy of an upgoing wave at a time T2 where the upgoing wave reflects off the sea surface 305 at a time T3 and where the sensors may sense energy of a downgoing multiple reflected wave at a time T4 (see also the data 180 of FIG. 1 and data 340 of FIG. 3). In such an example, sensing of the downgoing multiple reflected wave may be considered noise that interferes with sensing of one or more upgoing waves. As an example, an approach that includes summing data acquired by a geophone and data acquired by a hydrophone may help to diminish noise associated with downgoing multiple reflected waves. Such an approach may be employed, for example, where sensors may be located proximate to a surface such as the sea surface 305 (e.g., arrival times T2 and T4 may be relatively close). As an example, the sea surface 305 or a water surface may be an interface between two media. For example, consider an air and water interface. As an example, due to differing media properties, sound waves may travel at about 1,500 m/s in water and at about 340 m/s in air. As an example, at an air and water interface, energy may be transmitted and reflected.

As an example, each of the sensors 332 may include at least one geophone 334 and a hydrophone 336. As an example, a geophone may be a sensor configured for seismic acquisition, whether onshore and/or offshore, that can detect velocity produced by seismic waves and that can, for example, transform motion into electrical impulses. As an example, a geophone may be configured to detect motion in a single direction. As an example, a geophone may be configured to detect motion in a vertical direction. As an example, three mutually orthogonal geophones may be used in combination to collect so-called 3C seismic data. As an example, a hydrophone may be a sensor configured for use in detecting seismic energy in the form of pressure changes under water during marine seismic acquisition. As an example, hydrophones may be positioned along a string or strings to form a streamer or streamers that may be towed by a seismic vessel (e.g., or deployed in a bore). Thus, in the example of FIG. 3, the at least one geophone 334 can provide for motion detection and the hydrophone 336 can provide for pressure detection. As an example, the data 340 (e.g., analog and/or digital) may be transmitted via equipment, for example, for processing, etc.

As an example, a method may include analysis of hydrophone response and vertical geophone response, which can be used to obtain so-called PZ summation to reduce the receiver ghost and/or free surface-multiple noise contamination. As an example, a ghost may be defined as a reflection of a wavefield as reflected from a water surface (e.g., water and air interface) that is located above a receiver, a source, etc. (e.g., a receiver ghost, a source ghost, etc.). As an example, a receiver may experience a delay between an upgoing wavefield and its downgoing ghost, which may depend on depth of the receiver.

As an example, a surface marine cable may be or include a buoyant assembly of electrical wires that connect sensors and that can relay seismic data to the recording seismic vessel. As an example, a multi-streamer vessel may tow more than one streamer cable to increase the amount of data acquired in one pass. As an example, a marine seismic vessel may be about 75 m long and travel about 5 knots, for example, while towing arrays of air guns and streamers containing sensors, which may be located, for example, about a few meters below the surface of the water. A so-called tail buoy may assist crew in location an end of a streamer. As an example, an air gun may be activated periodically, such as about intervals of 25 m (e.g., about intervals of 10 seconds) where the resulting sound wave travels into the Earth, which may be reflected back by one or more rock layers to sensors on a streamer, which may then be relayed as signals (e.g., data, information, etc.) to equipment on the tow vessel.

In the example of FIG. 3, the equipment 310 may include a system such as the system 350. As shown in FIG. 3, the system 350 includes one or more information storage devices 352, one or more computers 354, one or more network interfaces 360 and instructions 370. As to the one or more computers 354, each computer may include one or more processors (e.g., or processing cores) 356 and memory 358 for storing the instructions 370 (e.g., modules, etc.), for example, executable by at least one of the one or more processors. As an example, a computer may include one or more network interfaces (e.g., wired or wireless), one or more graphics cards, a display interface (e.g., wired or wireless), etc. As an example, a method can include rendering information to a display, for example, via circuitry (e.g., of a computing system, etc.).

As an example, a method can include rendering one or more parameters, paths, etc. associated with a deviation survey of a borehole in a geologic environment to a display, for example, optionally during processing of data that may act to refine a deviation survey. Such an example, may optionally be implemented while drilling, for example, to allow an operator to more particularly guide a drilling operation, to allow a controller to more particularly control a drilling operation, etc.

As an example, pressure data may be represented as "P" and velocity data may be represented as "Z". As an example, a hydrophone may sense pressure information and a geophone may sense velocity information. As an example, hydrophone may output signals, optionally as digital data, for example, for receipt by a system. As an example, a geophone may output signals, optionally as digital data, for example, for receipt by a system. As an example, the system 350 may receive P and Z data via one or more of the one or more network interfaces 360 and process such data, for example, via execution of instructions stored in the memory 358 by the processor 356. As an example, the system 350 may store raw and/or processed data in one or more of the one or more information storage devices 352.

Figure 4:
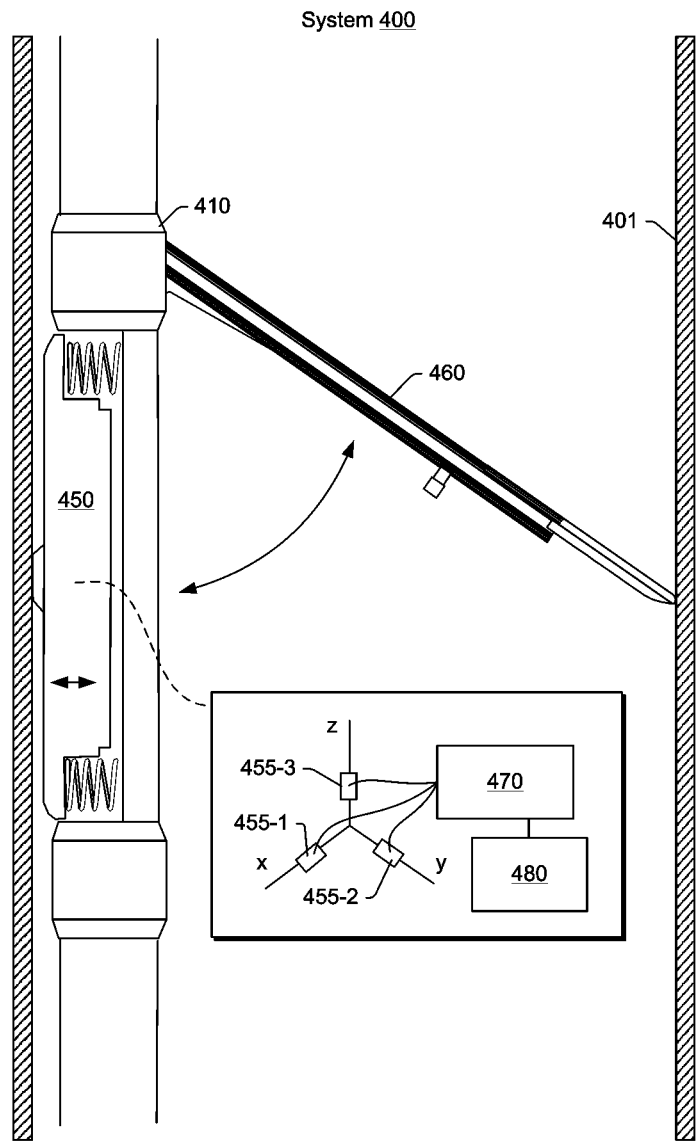
FIG. 4 illustrates an example of a system that includes at least one receiver in a borehole.

FIG. 4 shows an example of a system 400 with respect to a borehole 401 where the system 400 includes a tool body 410, a receiver assembly 450 and a caliper 460. As shown, the receiver assembly 450 may be relatively "de-coupled" from the tool body 410 for purposes of acoustic isolation and/or noise suppression. The caliper 460, shown extended, can positively anchor the receiver assembly 450, for example, to reduce signal distortion. Such a system may be implemented, for example, in openhole, cased boreholes, etc.

In the example of FIG. 4, the receiver assembly 450 is shown as including three accelerometers 455-1, 455-2 and 455-3 that are operatively coupled to circuitry 470, which may, for example, be operatively coupled to memory 480 (e.g., for storing one or more of instructions, data, etc.). As an example, the circuitry 470 may include digitization circuitry (e.g., one or more analog-to-digital converters) and other circuitry. For example, analog signals from the accelerometers 555-1, 455-2 and 455-3 may be digitized by the circuitry 470 and optionally stored in the memory 480 (e.g., as digital data). As an example, the receiver assembly 450 may sense seismic energy and store and/or output seismic waveforms based at least in part on sensed seismic energy. As an example, the system 400 may be suitable for acquiring P-wave information and S-wave information.

As an example, the system 400 can include one or more features of the VERSATILE SEISMIC IMAGER™ (VSI) tool marketed by Schlumberger Limited (Houston, Tex.). The VSI tool can enable flexibility in shuttle spacing on logging cable for acquiring three-component (3C) borehole seismic data. The acoustically isolated seismic sensor package features 3C omni-tilt geophone accelerometers, with the sensors decoupled from the tool body, for measuring particle motion (e.g., of a formation). The VSI tool includes digitization circuitry physically close to the sensor package, which may reduce signal distortion, for example, by removing tool harmonic noise and tube waves from the borehole-seismic band. As an example, a three-component receiver may include receiver circuitry that can provide for an approximately 20 Hz flat bandwidth in acceleration: about 2 Hz to about 200 Hz; and, for example, a 24-bit analog to digital converter (ADC). As an example, a receiver may include circuitry that can provide a sampling rate such as, for example, 1 ms (e.g., about 1000 Hz), 2 ms (e.g., about 500 Hz), 4 ms (e.g., about 250 Hz) and/or another suitable rate.

Multicomponent seismic sensors may be assembled in seismic acquisition systems in different forms. As an example, for onshore seismic acquisition, sensors may be integrated in a case that can be connected to one or more other elements of an acquisition system via a cable or, for example, separate as in nodal configurations. For offshore acquisition, sensors may be integrated in a cable or embedded in a semi-autonomous and/or autonomous seismometer. For borehole seismic acquisition, technology for deploying multi-component sensors may be wireline-based, for example, where azimuthal rotation of a sensor sting may be relatively uncontrollable (e.g., rotating or spinning about an axis defined by a bore, a wireline, a body of a movable assembly, etc.).

As an example, equipment may be "packaged", for example, where a body, a case, etc. includes one or more sensors. As an example, a package may be modeled as a rigid body. For example, consider a rigid body where the location of each point of the rigid body can be represented using parameters. For example, consider an example that includes the following six parameters: location of its center of mass and three angles called yaw, pitch and roll, which may also be referred to as heading, elevation and bank. Such three angles, together, may be referred to as the attitude (or orientation) of a rigid body.

As an example, where sensors inside a sensor package are not gimballed but rather fixed to a frame (e.g., or other fixed structure of the package), the orientation of the sensors can coincide with that of the frame. As an example, where a vertical sensor is gimballed, then information and/or control circuitry may be available such that the multicomponent sensors can be kept in a relatively upright position. However, a gimballed seismic sensor or sensors may not reliably produce desired response. For example, a gimballed sensor may provide an undesirable response, which may impact quality of seismic data.

As an example, orientation of a sensor package may be provided by the acquisition system itself, for example, using one or more of inclinometers and/or compasses. However, such types of orientation measurement equipment can operate with uncertainty and thus make acquired seismic data subject to various forms of quality control.

As an example, estimation of three angles (e.g., yaw, pitch and roll or heading, elevation and bank) may be performed using direct arrivals or, for example, using a complete seismic record. Techniques based upon direct arrivals exploit linearly polarized horizontal components of the direct arrival in a stratified medium, which tend to be linearly polarized in the source-receiver direction for the azimuths and to further exploit preservation of the horizontal component of the slowness vector in a stratified medium. Such techniques do not make use of the vertical component of the direct arrivals, which at short offsets is tends to be the dominant component in the case of seabed acquisition with a flat or nearly flat bathymetry. Such techniques cannot readily use medium to large offsets because direct arrivals tend to be mixed up with the refractions.

As to estimation of orientation via a complete seismogram (see, e.g., Krieger and Grigoli, 2015), such an approach demands a similarity of the measured signals. To assure that this criterion is satisfied, the spatial separation between multicomponent sensors is to be small compared to the main signal wavelength. To achieve this, data are frequency low-pass filtered with a narrow filter (e.g., cut-off frequency of about 0.1 Hz). Such low pass filtering reduces the usable bandwidth and consequently the signal-to-noise ratio (SNR) and, therefore, makes it unpractical for seismic exploration.

As an example, a method can utilize bandwidth of data without near offset restriction for determining orientation of a sensor such as, for example, as to one or more of a sensor deployed at a seabed, a sensor deployed onshore, a sensor deployed in a borehole, etc. As an example, a method can include receiving information germane to elastic properties of two elastic media that exist at an interface where a sensor is deployed. Such a method can include imposing boundary conditions germane to the interface.

Figure 5:
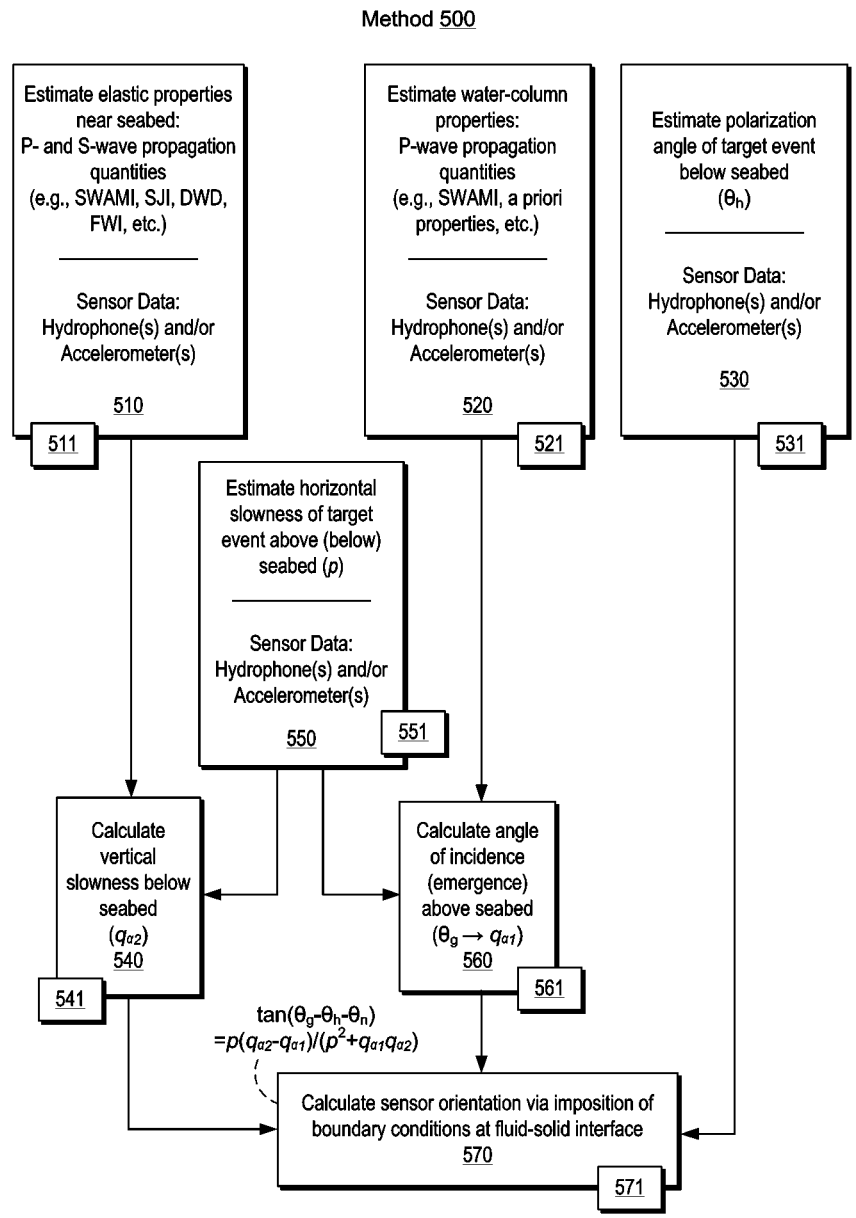
FIG. 5 illustrates an example of a method.

FIG. 5 shows an example of a method 500 that includes an estimation block 510 for estimating near seabed elastic properties (e.g., P- and S-wave propagation quantities) based on sensor data (e.g., one or more hydrophones and/or one or more accelerometers), an estimation block 520 for estimating water-column properties (e.g., P-wave propagation quantities) based on sensor data (e.g., one or more hydrophones and/or one or more accelerometers), an estimation block 530 for estimating below seabed polarization angle of a target event (e.g., directly below seabed-water interface) based on sensor data (e.g., one or more hydrophones and/or one or more accelerometers), an estimation block 550 for estimating horizontal slowness of the target event above (below) seabed based on at least a portion of the sensor data, a calculation block 540 for calculating vertical slowness below seabed based on output of estimates from the blocks 510 and 550, a calculation block 560 for calculating an angle of incidence (e.g., emergence) above seabed based on output of estimates from the blocks 520 and 550, and a calculation block 570 for calculating sensor orientation at least in part via imposition of boundary conditions at a fluid-solid interface (e.g., seabed-water interface) based on output calculations of the blocks 540 and 560 and output an estimation of the block 530.

As to an accelerometer, an accelerometer can be a device that can measure ground particle displacement and/or time derivatives thereof. As an example, a seabed sensor (see, e.g., the nodes 290 of FIG. 2) can include at least one sensor that can measure ground particle displacement and/or time derivatives thereof. As an example, the system 400 of FIG. 4 can include at least one sensor that can measure ground particle displacement and/or time derivatives thereof.

As an example, the method 500 can include using a shear wave velocity that can be estimated using surface waves onshore and offshore in shallow-medium water depths. As an example, the method 500 may be implemented without making an assumption that the "nominal" vertical axis of the multicomponent sensor is close to the vertical when the sensor is deployed. As an example, the method 500 may include receiving information as to direct or compressional refracted arrivals. As an example, the method 500 may utilize a relatively large portion of bandwidth of seismic data (e.g., in a range up to and including about 100 percent). For example, trials may be performed using portions of bandwidth where a percentage of bandwidth may be selected (e.g., greater than about 50 percent, etc.). As an example, a default may utilize data that corresponds to the complete bandwidth of acquired seismic data. As an example, the method 500 may include using seabed compressional velocities estimated via one or more techniques based upon Guided Wave Inversion (GWI) and/or Full Waveform Inversion (FWI) (see, e.g., the block 510). As an example, the method 500 may include using approximate knowledge of sea water velocity (e.g., or velocities). As an example, the method 500 can include estimating horizontal slowness of a target event (see, e.g., the block 550). Such an approach may be employed even where a multicomponent sensor is not deployed in the upright position (e.g., vertical position). As an example, the method 500 can include receiving position information as to positions of sensors (e.g., where information as to characteristics, types, etc., of sensor are known). As an example, the method 500 can include determining orientation of one or more sensors based on data from a 2D geometry survey (e.g., single source-receiver azimuth); noting that additional data may be received and utilized.

As an example, the method 500 may be employed based upon a seabed seismic acquisition and target event corresponding to direct compressional waves (P-waves). Various example equations and processes are explained below as to such an example, noting that, as mentioned, a method such as the method 500 may be employed for other environments, for example, to determine orientation as to one or more sensors (e.g., consider onshore surface acquisition, VSP acquisition, etc.). As an example, an interface and boundary conditions imposed thereon may be for a two media interface such as liquid-solid or, for example, solid-air (e.g., onshore surface) and/or solid-solid (e.g., VSP).

As an example, consider a scenario. In such a scenario if the polarization of a P-wave impinging a multicomponent sensor resting at the seabed had been equal to the polarization angle of the recorded particle displacements, the orientation of a multicomponent sensor could be determined by polarization analysis and by measuring the horizontal slowness of the incident wave.

However, as an example, in a more realistic scenario, when a multicomponent sensor is deployed at the seabed, the particle displacement is the combination of the particle displacements of the incident, reflected and refracted waves including the mode conversions, in the case of two elastic media. In a particular case of two acoustic media, polarizations angle of an incident wave ($g_p$) and the polarization of the recorded displacements ($_p$) below the seabed, are, in the asymptotic ray tracing approximation. For example, consider the equations (1) and (2) as set forth below.

$$g_p = \begin{bmatrix} u_{t1} \\ u_{n1} \end{bmatrix} = \frac{1}{\sqrt{2\rho_1 q_{\alpha 1}}} \begin{bmatrix} p \\ q_{\alpha 1} \end{bmatrix} \quad (1)$$

$$p = \begin{bmatrix} u_{t2} \\ u_{n2} \end{bmatrix} \frac{\sqrt{2\rho_1 q_{\alpha 1}}}{\rho_2 q_{\alpha 1} + \rho_1 q_{\alpha 2}} \begin{bmatrix} p \\ q_{\alpha 2} \end{bmatrix} \quad (2)$$

where p and q are the horizontal and vertical slownesses and ρ is the density, $u_t$ and $u_n$ are the tangential and normal displacements, respectively. Further, the subscripts 1 and 2 indicate two semi-infinite media. As an example, as explained further below, $q_{\alpha 1}$ can be the vertical slowness just above the seabed and $q_{\alpha 2}$ can be the vertical slowness just below the seabed (see, e.g., the block 540 (below seabed) and the block 560 (above seabed) of FIG. 5). If the multicomponent sensor is rotated around an axis perpendicular to the propagation plane of $\theta_n$, the difference between the polarization angle $\theta_h$ and the angle of incidence $\theta_g$ is given by, for example, the equation (3):

$$\tan(\theta_g \; \theta_h \; \theta_n) = p \frac{q_{\alpha 2} - q_{\alpha 1}}{p^2 + q_{\alpha 1} q_{\alpha 2}} \quad (3)$$

The text Chapman, C. H. (2004). Fundamentals of Seismic Wave Propagation. Cambridge University Press. ISBN 978-0-521-81538-3, is incorporated by reference herein. The Chapman text is organized as follows: Preface; Preliminaries; Nomenclature; Symbols; Special functions; Canonical signals; 1. Introduction; 2. Basic wave propagation; 3. Transforms; 4. Review of continuum mechanics and elastic waves; 5. Asymptotic ray theory; 6. Rays at an interface; 7. Differential systems for stratified media; 8. Inverse transforms for stratified media; 9. Canonical signals; 10. Generalizations of ray theory; Appendix A. Useful integrals; Appendix B. Useful Fourier transforms; Appendix C. Ordinary differential equations; Appendix D. Saddle-point methods; Bibliography; Author index; Subject index. As to equations (1) and (2), above, consider equations 6.6.1 and 6.6.4 of Chapman (see, e.g., "6. Rays at an interface"). As an example, as to equation (3), above, a method may also or alternatively implement one or more other equation or equations. For example, consider equations in Chapman (see, e.g., "7. Differential systems for stratified media").

Above, the example equation (3) corresponds (for an acoustic approximation) to, for example, the block 570 of the method 500 of FIG. 5. As an example, for isotropic and/or anisotropic elastic seabeds, equations in Chapman, 2004 (see, e.g., "7. Differential systems for stratified media") may be used. As an example, in the case of a single, event, the horizontal slowness p of an impinging wave (or in general the target event), can be estimated (see, e.g., the block 550 of the method 500 of FIG. 5). Such an approach may be utilized even though a multicomponent sensor is not deployed in an upright position, for example, by using hydrophone data at approximately the same location (e.g., within a common package, etc.). As an example, as depth-dependent sea-water velocity may be approximately known (e.g., or it can be estimated per the block 520 of the method 500 of FIG. 5), the sea velocity in the proximity of the sensor, $v_1$, can be used to calculate the angle of incidence, $\theta_g$, (see, e.g., the block 560 of the method 500 of FIG. 5) and consequently the vertical slowness just above the seabed $q_{\alpha 1}$ according to the following example equations (4) and (5):

$$\theta_g = \mathrm{asin}(pv_1) \quad (4)$$

and $$q_{\alpha 1} = \frac{\cos(\theta_g)}{v_1} \quad (5)$$

As an example, after P-wave velocity just below the seabed is estimated (see, e.g., the block 510 of the method 500 of FIG. 5), the vertical slowness just below the seabed, $q_{\alpha 2}$, can be determined (see, e.g., the block 540 of the method 500 of FIG. 5) according to the following example equation (6):

$$q_{\alpha 2} = \sqrt{\frac{1}{v_2^2} \; p^2} \quad (6)$$

The polarization angle $\theta_h$ can be determined using one or more techniques for processing multicomponent data (see, e.g., Kanasewich, E. R., 1981. Time sequence analysis in geophysics, University of Alberta Press, Edmonton, which is incorporated by reference herein). In the example equation (3), above, the unknown therein is the desired rotation angle $\theta_n$.

As an example, a method can include receiving information associated with an interface between a first medium and a second medium where the information includes sensor data; based on at least a portion of the information, estimating wave properties that include elastic properties (see, e.g., the block 510), depth-dependent properties (see, e.g., the block 520) and horizontal slowness (see, e.g., the block 550); and, based on the estimated wave properties, calculating an orientation of a sensor utilized to acquire at least a portion of the sensor data (see, e.g., the block 570). In such an example, the wave properties include properties of one or more media through which waves can travel (e.g., wave properties include wave-related properties). For example, elastic properties can be properties for one or more media through which elastic waves (e.g., seismic waves) can travel.

As an example, the method 500 of FIG. 5 may be implemented to calculate the orientation of a multicomponent seismic sensor deployed at the seabed, onshore or in a borehole. Such an example can include using estimated elastic properties of two elastic media that define an interface at which interface the multicomponent seismic sensor is deployed. In such an example, boundary conditions can be imposed for the interface. While the block 570 in FIG. 5 mentions a fluid-solid interface, one or more other types of interfaces may be analyzed (e.g., solid-solid, air-solid, etc.). As an example, for a fluid-solid interface that is a water-seabed interface, the block 510 can include receiving sensor data that is hydrophone data, the block 520 can include receiving data that is hydrophone data and, for example, the block 530 can include receiving data that is multicomponent accelerometer data. As an example, the blocks 510, 520 and 530 can include receiving information that includes sensor data from one or more types of sensors.

The method 500 is shown in FIG. 5 in association with various computer-readable media (CRM) blocks 511, 521, 531, 541, 551, 561 and 571. Such blocks generally include instructions suitable for execution by one or more processors (or cores) to instruct a computing device or system to perform one or more actions. While various blocks are shown, a single medium may be configured with instructions to allow for, at least in part, performance of various actions of the method 500. As an example, a computer-readable medium (CRM) may be a computer-readable storage medium. A computer-readable storage medium is not transitory, not a signal and not a carrier wave.

As an example, one or more computer-readable storage media can include processor-executable instructions to instruct a computing system to: receive information associated with an interface between a first medium and a second medium where the information includes sensor data; based on at least a portion of the information, estimate wave properties that include elastic properties, depth-dependent properties and horizontal slowness; and based on the estimated wave properties, calculate an orientation of a sensor utilized to acquire at least a portion of the sensor data.

In a case of air-elastic isotropic (anisotropic) solid and liquid-solid interfaces, corresponding boundary conditions can be applied to determine reflection coefficients (see, e.g., Chapman, 2004); however, more complex expressions are obtained. The difference between the polarization angle, the angle of incidence and the rotation angle depends on the seabed elastic properties. In the case of a seabed modeled as an isotropic solid with known compressional velocity and density, but unknown shear velocity, the difference between angle of incidence and polarization angle is displayed in FIG. 6.

Figure 6:
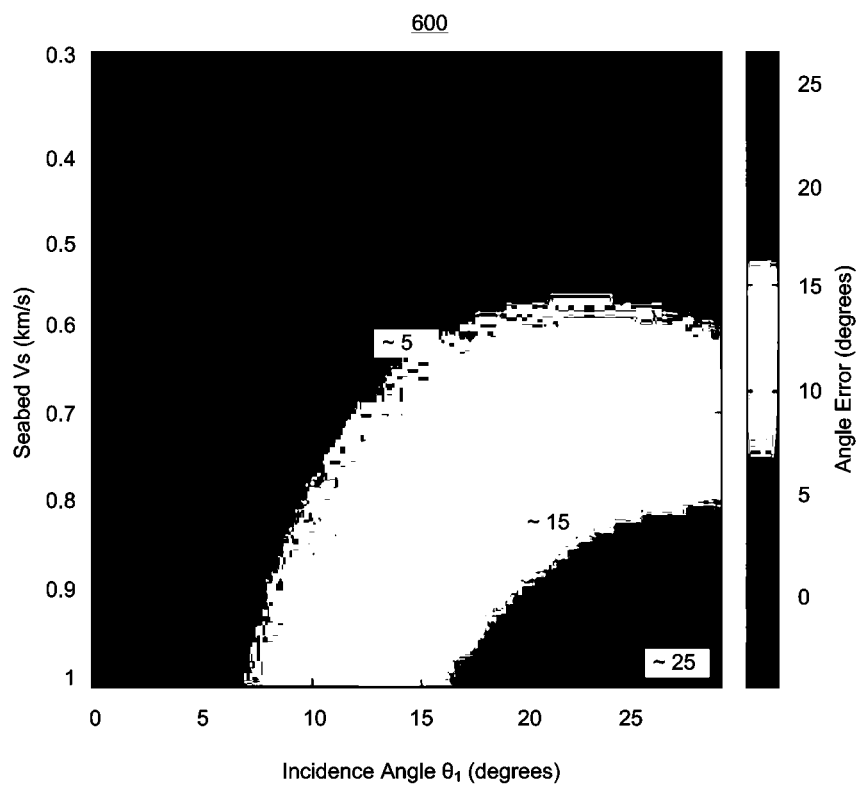
FIG. 6 illustrates an example of a plot of the difference between angle of incidence and polarization angle.

FIG. 6 shows a plot 600 that illustrates effects of boundary conditions on the polarization angle at a liquid-solid interface. The difference between the angle of incidence and the polarization angle is shown for a range of angles of incidence. A compressional wave impinges the seabed from the water layer (Vp=1.5 [km/s], $\rho$=1.0 [g/cm3]) with a set of angles of incidence indicated in the panels as $\theta_1$. The seabed is modeled as isotropic with Vp=2 [km/s]. The effect of the seabed shear velocity is studied. A positive value of the angle error indicates that the polarization angle (with respect to the normal to the seabed) is smaller than the angle of incidence.

As an example, knowledge of the seabed shear velocity enables a process to adjust for the difference between angle of incidence and polarization angle such that the sensor rotation with respect to the vertical can be determined using horizontal and vertical displacements. The difference between angle of incidence and polarization increases with the angle of incidence of the impinging P-wave and with the seabed shear velocity.

Although the foregoing example is described with respect to a numerical example based on a seabed modeled as a homogeneous solid half-space, as an example, a model may be represented by a stratified seabed (e.g., a model may be a stratified seabed model). The difference between angle of incidence and polarization angle can therefore be determined using one or more reflectivity code and the currently available model of the depth-dependent elastic properties of the seabed. Some examples of techniques to determine and solve the ordinary differential equations for acoustic, isotropic and anisotropic stratified elastic media appear in Chapman, 2004 (see, e.g., 7. Differential systems for stratified media; 8. Inverse transforms for stratified media).

Although the above examples of boundary condition equations refer to a 2D case, as an example, an extension can be made to a three-dimensional (3D) case. For example, equations provided by Chapman, 2004, may be applied to extend the boundary condition equations to an extra dimension.

Referring again to the method 500 of FIG. 5, the estimation blocks 510, 520 and 530 can be computed with respect to an elastic model. As an example, estimation of the horizontal slowness can be performed using linear moveout velocity analysis for linear events (e.g. refracted arrivals) or stacking velocity analysis for hyperbolic events or one or more other techniques for dip estimation.

As an example, for seismic data acquired in shallow water, the inversion of Scholte waves can enable the estimation of the depth-dependent shear wave velocity. As an example, P-waves guided in a water layer or full waveform inversion can be applied to estimate the compressional velocities close to the seabed.

Figure 7:
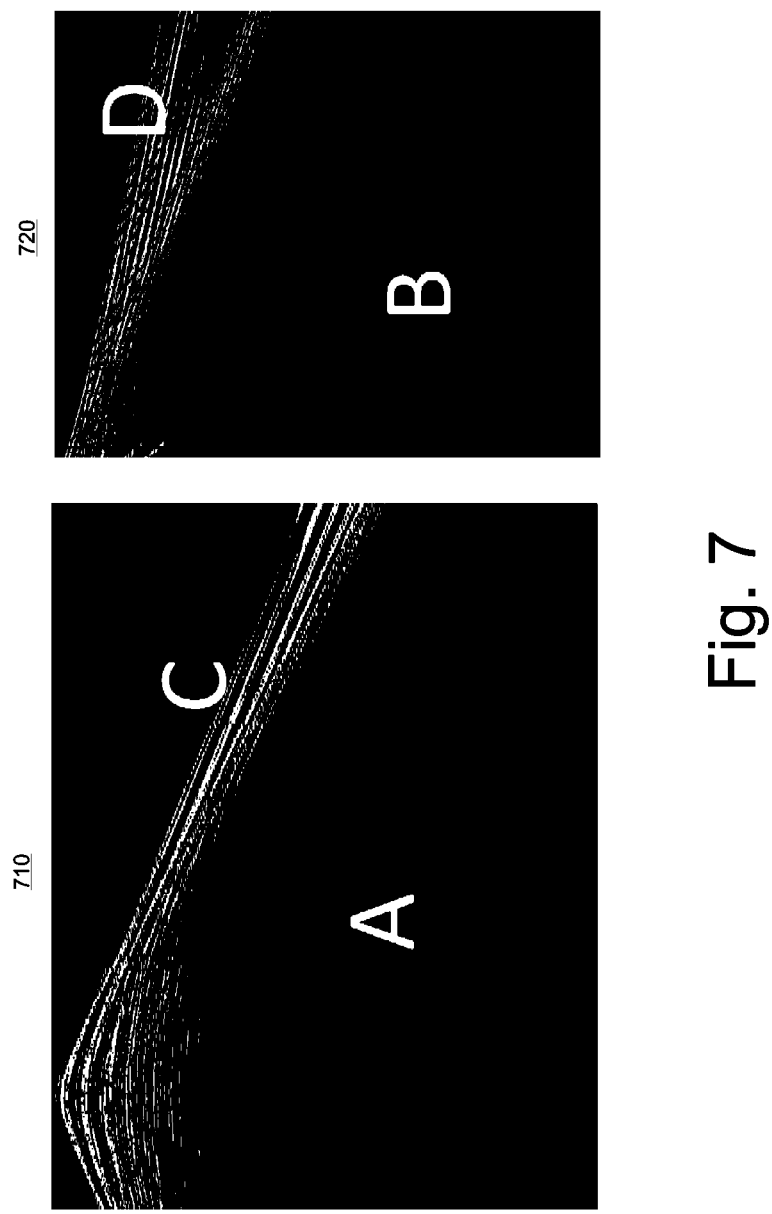
FIG. 7 illustrates examples of plots corresponding to shot records of a seabed survey.

FIG. 7 shows example plots 710 and 720 of minimally preprocessed hydrophone component data acquired in shallow water from ocean-bottom cables (OBC) and towed streamers. Specifically, FIG. 7 shows: the plot 710 of example shallow-water OBC receiver gather with Scholte waves (A) and guided P-waves (C); and; the plot 720 of example shallow water towed-streamer shot gather with Scholte waves (B) and guided P-waves (D).

The waves propagating as normal modes are represented by a low-velocity, low-frequency wavetrain identified with Scholte waves (events A and B). The high frequency part of Scholte waves is composed mainly of Stoneley waves localized in the vicinity of the liquid/solid interface; whereas, at lower frequencies, they consist of Rayleigh waves propagating in the layers below the seabed (see, e.g., Shtivelman, V., 2004, Estimating shear wave velocities below the sea bed using surface waves. Near Surface Geophysics, 2, 241-247, which is incorporated by reference herein). Because the interface waves decay rapidly with increasing distance to the liquid/solid interface, sources and receivers can be relatively close to the seabed. As an example, Scholte waves can be recorded by OBC and, for example, in very shallow water, by towed streamers.

From trials in areas with various geological conditions using different acquisition geometries, most of the energy of the waves is localized within a narrow range of low frequencies, for example, between about 1.5 Hz and about 8 Hz. As an example, phase velocities of Scholte waves are related to the S-wave velocities (VS) below the water bottom and, for example, can be inverted to estimate them in the subwater layers (see, e.g., Shtivelman, 2004; Boiero, D., Wiarda, E., and Vermeer, P., 2013, Surface- and guided-wave inversion for near-surface modeling in land and shallow marine seismic data. The Leading Edge, 32, 638-646, which is incorporated by reference herein).

Guided waves propagating as leaking modes are composed mostly of multiply reflected P-waves; whereas, their resonant character tends to be due to S-waves leaking outwards from the upper layers (events C and D in the plots 710 and 720 of FIG. 7). Such information may present a number of characteristic features, for example: 1) their dispersion patterns can have a resonant frequency-tuned appearance; 2) they can have relatively high cut-off frequencies; and 3) their phase velocities can exceed the velocity of the water (Shtivelman, 2004).

As an example, where subwater layers are composed of relatively soft saturated rocks with high Poisson's ratio, the leaking modes can be approximated by guided acoustic waves. By inverting the guided-wave dispersion curves, the vertical distribution of the P-wave velocity (VP) in the shallow subwater layers can be estimated (see, e.g., Shtivelman, 2004; Boiero et al., 2013). As an example, water velocity can influence the propagation of guided waves, and error in its measurement can be transferred into bottom property inverse estimates. In the absence of such detailed water column measurements, a method can include performing a joint inverse (joint inversion) for the water column and bottom properties. If the water column signal dominates the bottom signal, the inverse will estimate the larger signal better; however, it may do so poorly on the bottom. As an example, a method may employ proper weighting techniques and a priori information if such an approach is to be employed (see, e.g., Rajan, S. D. G. V. Frisk, K. M. Becker, J. F. Lynch, G. Potty and J. H. Miller, 2008, Modal inverse techniques for inferring geoacoustic properties in shallow water. Important Elements in: Geoacoustic Inversion, Signal Processing, and Reverberation in Underwater Acoustics, 2008: 165-234).

As an example, different Scholte and guided P-wave modes can be analyzed together to build a reliable near-surface velocity model. For example, consider a method that includes: obtaining a high-resolution spatial distribution of the modes' properties; and inverting the modes' properties to a near-surface model.

As an example, a method can include performing an analysis for extracting local wavenumber as a function of frequency, k(f), for different modes. As an example, phase velocity estimation can be performed, for example, according to an approach of Strobbia, C., Laake, A., Vermeer, P., and Glushchenko, A., 2011, Surface waves: use them then lose them. Surface-wave analysis, inversion and attenuation in land reflection seismic surveying. Near Surface Geophysics, 9, 503-514, which is incorporated by reference herein. Such an approach is based on the use of high-resolution, unevenly spaced F-K transforms to estimate the local properties of surface waves within a patch of receivers. The analysis workflow extracts the local properties of the linear event of interest (Scholte or guided-wave modes) and can be run on source and receiver lines, for example, for 3D acquisition geometries, where the results can be merged into a volume representing the surface-wave properties (at a certain frequency) within a survey.

Figure 8:
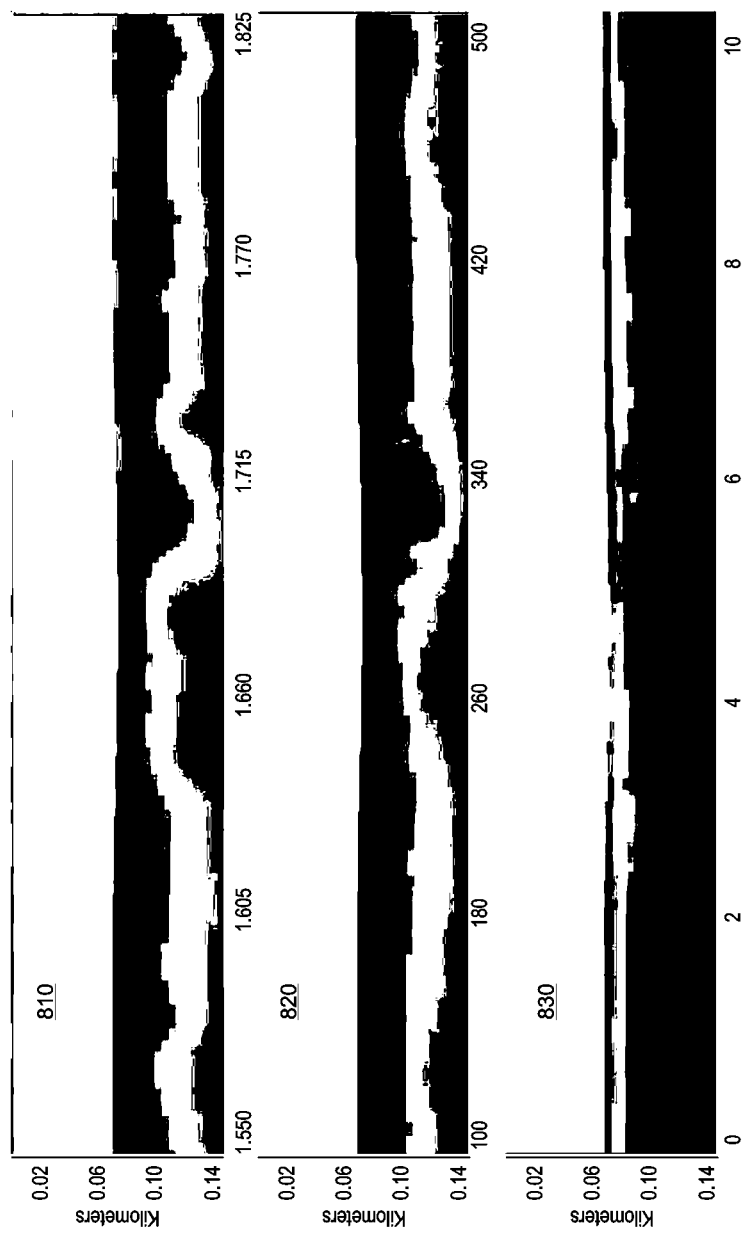
FIG. 8 illustrates examples of plots.

FIG. 8 shows three example plots 810, 820 and 830 of a sea-bottom model vertical section obtained by inverting Scholte and P-guided phase velocities along a receiver line. In the example plots 810, 820 and 830, depth is shown in kilometers from a range of about 0 kilometers being water surface to about 0.14 kilometers, which is a depth that extends below a seabed (e.g., sea-bottom surface).

Phase velocity inversion at each location can provide the medium velocities. As an example, an inversion algorithm can modify S- and P-wave velocities to match the estimated dispersive events with the secular function solutions (see, e.g., Boiero et al., 2013).

Figure 9:
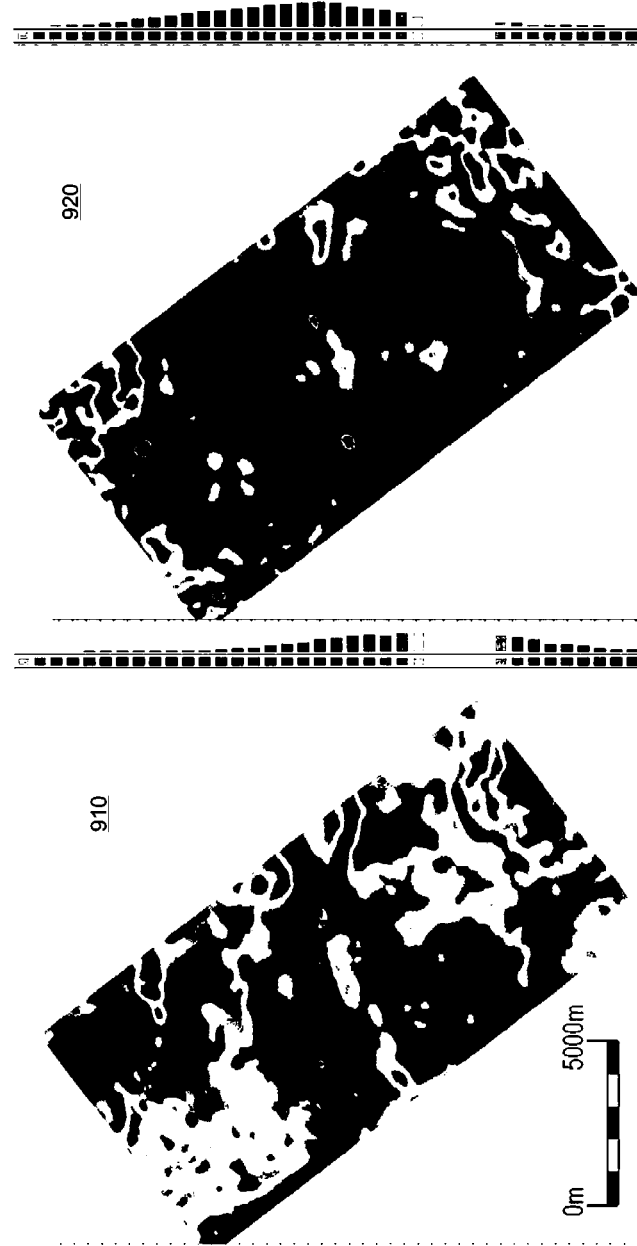
FIG. 9 illustrates examples of plots.

FIG. 9 shows example plots 910 and 920 as near-surface Vp and Vs from Scholte- and guided-wave inversion. Specifically, the plot 910 shows Vp from Scholte wave inversion (SWI) and the plot 920 shows Vs from guided-wave inversion (GWI). The region illustrated in the plots 910 and 920 corresponds to a depth slice thickness of approximately 110 meters at approximately 40 meters below the seabed. The plots 910 and 920 are inferred by inverting the phase velocities estimated along source and receiver lines.

As an example, a method may include processing data to determine one or more aspects as to coupling. For example, data may be processed to determine whether acceptable coupling of a multicomponent sensor exist, for example, for purposes of estimating a frequency-independent orientation. In the case of imperfect coupling, sometimes referred to as "vector infidelity", a method can include applying processing to the frequency range at which coupling is not problematic (e.g., via a quality control analysis, etc.). Vector infidelity is a frequency-dependent phenomenon that can become problematic above a threshold frequency that depends on the assembly of the sensor (e.g., package) and on seabed properties.

As an example, an estimation of the orientation can be carried out in an iterative manner. For example, consider a method that includes estimating orientation at low frequencies, adjusting of the sensor orientation to rotate it in a vertical correction, estimating and compensating of one or more coupling inconsistencies (e.g., via an appropriate technique) and updating the orientation to commence another iteration.

Figure 10:
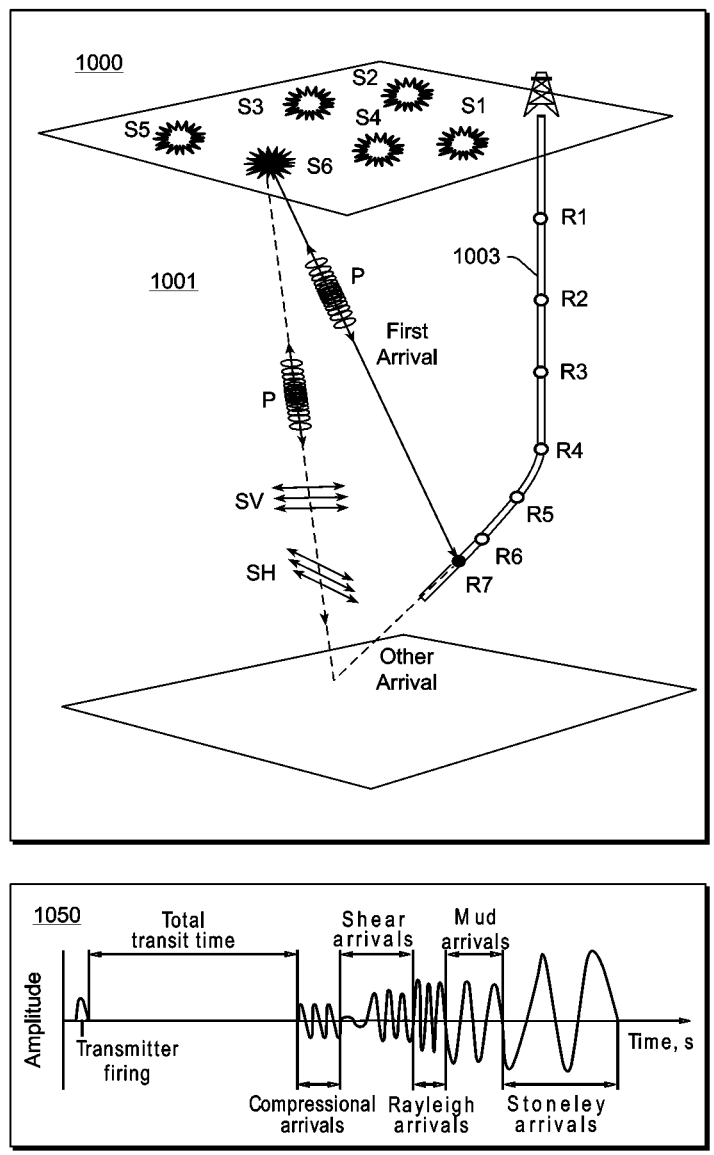
FIG. 10 illustrates an example of a survey in an environment.

FIG. 10 shows an example of a survey 1000 that includes a geologic environment 1001 with a borehole 1003. The survey 1000 includes positioning a receiver or receivers at various locations R1 to R7 and activating sources S1 to S6. Thus, in such an example, seismic waveforms may be acquired for each of the locations R1 to R7 that correspond to the plurality of sources S1 to S6. For example, a dataset for the receiver R1 can include data corresponding to the sources S1 to S6, a dataset for the receiver R2 can include data corresponding to the sources S1 to S6, etc.

In the example of FIG. 10, energy that travels in a path from the source S6 to the receiver at the location R7 is labeled "first arrival" (see, e.g., the downgoing direct arrival of the data 180 of FIG. 1). A dashed line in FIG. 10 indicates another arrival, for example, as reflected and upgoing (see, e.g., the upgoing energy of the data 180 of FIG. 1).

FIG. 10 also shows a plot 1050 of approximations of amplitude versus time for various types of energy responsive to firing of a transmitter (e.g., a source). As shown in the plot 1050, a transit time may be based at least in part on a compressional arrival at a receiver. As an example, the receivers of the example of FIG. 10 can include one or more multicomponent receivers. As an example, receivers can include hydrophones and/or geophones. As an example, receivers can include pressure sensors and/or particle motion sensors.

As an example, a method and/or workflow can include surface wave analysis (SWA). For example, a method may include SWA modeling and inversion (SWAMI). As an example, a framework may be provided that can perform SWA associated calculations (e.g., SWAMI calculations, etc.). As an example, such SWA calculations may be part of a workflow that can include, for example, one or more of the blocks of the method 500 of FIG. 5. As an example, a SWA may include determining orientations of one or more receivers (e.g., sensors).

As an example, consider the SWAMI velocity modeling framework marketed by Schlumberger Limited (Houston, Tex.), which may optionally be utilized at least in part with one or more other frameworks (e.g., PETREL®, OCEAN®, OMEGA, etc.). The SWAMI framework includes an inversion module that allows measurements from analysis of surface waves to be converted into a near-surface velocity model. Such a velocity model may be added to geological information and geophysical measurements to provide a more accurate representation of the near-surface structure. Such a framework may be utilized, for example, to initiate tomographic analysis, for example, as part of a prestack depth migration process.

As an example, a framework may include a near-surface modeling toolkit (NSM), for example, as a set of modules, workflow components, etc., that may provide for construction of velocity models, for example, optionally in conjunction with one or more seismic data processing frameworks (e.g., OMEGA framework, etc.). As an example, a framework may allow for one or more of import and export of geometry databases (e.g., as in the OMEGA framework), population of layered velocity models to gridded Volcan models (e.g., as in the PETREL® framework), creation of a smooth datum close to a recording surface (e.g., suitable for depth migration, etc.), surface-consistent static corrections to an above datum region (e.g., a near surface region as may be appropriate for a migration model), visualization of source and detector attributes at source and detector positions, source and detector data as "point sets" (e.g., as in the PETREL® framework object tree).

As an example, performing prestack depth migration on data (e.g., seismic data) may account for velocity variations in the near surface. As an example, a framework such as the SWAMI framework may be utilized to generate a relatively high-resolution velocity model. As an example, a high resolution, near-surface model may be utilized as part of a workflow (e.g., one or more method, etc.) to calculate surface consistent statics.

As an example, a framework can include receiving data that can include phase velocity information, for example, information picked from high-resolution spectra and inverted to a shear velocity section for a near surface region (e.g., for individual receiver lines). In such an example, by tessellating several receiver lines, 3D coverage may be achieved. As an example, a framework such as, for example, the SWAMI framework, may yield a shear velocity model for a near surface region, which may be in a range, for example, of about a first 100 m to about 150 m below the surface. As an example, aspects of a model and depth of a near surface region may depend in part on low frequency content and/or near-surface characteristics.

As an example, a surface-wave inversion may be implemented to model near surface shear wave velocity. As an example, a Rayleigh wave inversion problem may be formulated where a SWAMI framework may use a model-based approach. As an example, local surface wave modal dispersion curves may be extracted using, for example, an adaptive high-resolution wavefield transform (e.g., for each local super-gather). In such an example, a super-gather may be generated with multiple shots and receivers, for example, within a defined aperture. As an example, depending on data quality, one or more processing options may be selected. As an example, a method may include using a fundamental mode of a Rayleigh wave. As an example, a method can include picking wavenumber and frequency values, for example, automatically, semi-automatically or manually. As an example, one or more quality control checks may be implemented, optionally with editing (e.g., automatic, semi-automatic, user-implemented, etc.).

As an example, a workflow can include nondestructive tests on materials. For example, where information as to orientations of sensors may be germane to such tests, a method can include receiving data and processing such data to determine information associated with orientations.

Figure 11:
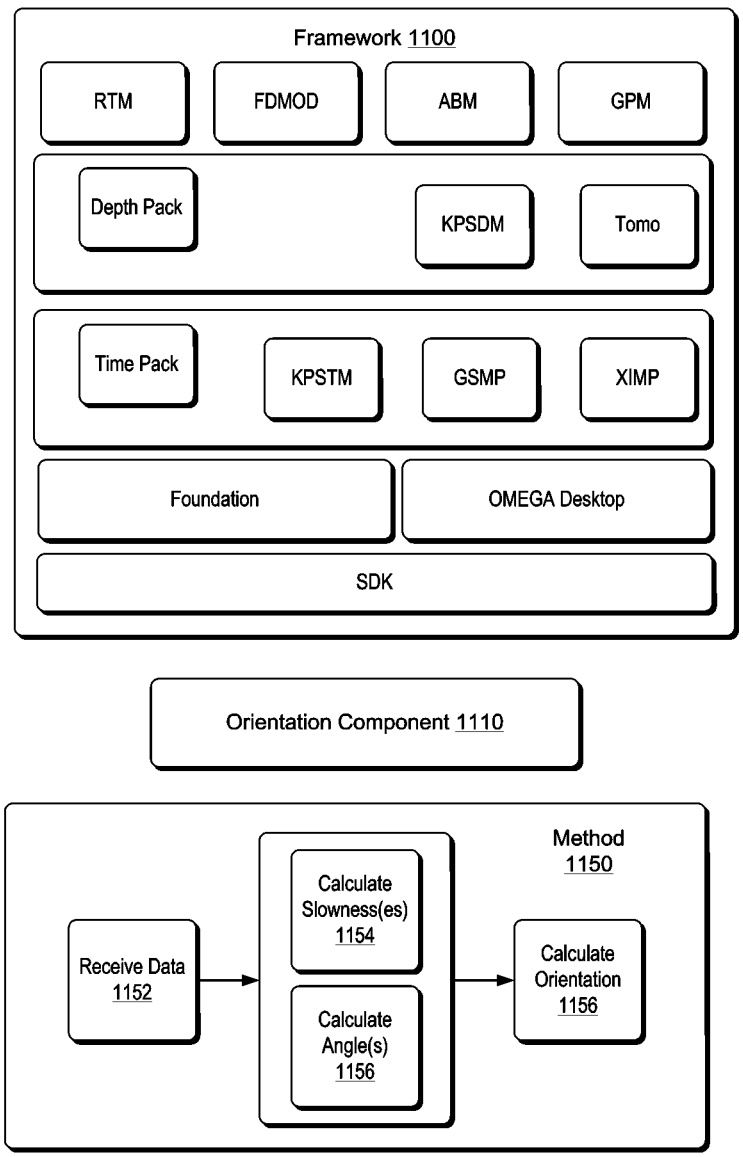
FIG. 11 illustrates an example of a framework, an example of a framework component and an example of a method.

FIG. 11 shows various components of an example framework 1100, for example, a framework such as the OMEGA framework (Schlumberger Limited, Houston, Tex.). As an example, the components can include an orientation component 1110. As an example, the components 1100 may be utilized as part of a workflow that includes processing seismic data. In such an example, the orientation component 1110 may be utilized to determine one or more sensor orientations (e.g., package orientations, etc.). As an example, the component 1110 may include instructions associated with one or more blocks such as, for example, one or more blocks of the method 500 of FIG. 5.

FIG. 11 also shows an example of a method 1150 that includes a reception block 1152 for receiving seismic data associated with an interface between two media (e.g., and optionally other information); a calculation block 1154 for, based at least in part on the seismic data, calculating vertical slowness in one of the media (e.g., and optionally one or more other slownesses); a calculation block 1156 for, based at least in part on the seismic data, calculating an angle of incidence in the other one of the media (e.g., and optionally one or more other angles); and a calculation block 1156 for, based at least in part on the vertical slowness and the angle of incidence, calculating an orientation of a sensor utilized to acquire at least a portion of the seismic data. In such a manner, the method 1150 may determine an orientation of a sensor.

As an example, a method can include calculating orientation by at least in part imposing boundary conditions associated with an interface. As an example, an interface may be one or more of a fluid-solid interface, a solid-solid interface, an air-solid interface, etc.

As an example, a method can include estimating elastic properties near the interface. As an example, a method can include estimating water-column properties. As an example, a method can include estimating a polarization angle of a target event. As an example, a method can include estimating horizontal slowness of a target event.

As an example, a sensor can be a sensor in a multi-sensor package. As an example, a sensor can be positioned at an interface, for example, consider a seafloor and seawater interface or another type of interface (e.g., between two media, etc.).

As an example, a method can include estimating P-wave properties and S-wave properties (see, e.g., the blocks 510 and 520 of the method 500 of FIG. 5).

As an example, a system can include a processor; memory operatively coupled to the processor; and processor-executable instructions stored in the memory to instruct the system to: receive seismic data associated with an interface between two media; based at least in part on the seismic data, calculate vertical slowness in one of the media; based at least in part on the seismic data, calculate an angle of incidence in the other one of the media; and based at least in part on the vertical slowness and the angle of incidence, calculate an orientation of a sensor utilized to acquire at least a portion of the seismic data.

As an example, one or more computer-readable storage media can include processor-executable instructions to instruct a computing system to: receive seismic data associated with an interface between two media; based at least in part on the seismic data, calculate vertical slowness in one of the media; based at least in part on the seismic data, calculate an angle of incidence in the other one of the media; and based at least in part on the vertical slowness and the angle of incidence, calculate an orientation of a sensor utilized to acquire at least a portion of the seismic data.

As an example, a method can include receiving information associated with an interface between a first medium and a second medium where the information includes sensor data; based on at least a portion of the information, estimating wave properties that include elastic properties, depth-dependent properties and horizontal slowness; and, based on the estimated wave properties, calculating an orientation of a sensor utilized to acquire at least a portion of the sensor data.

As an example, an orientation of a sensor can be a seabed orientation for the sensor as positioned on a seabed (e.g., as in a survey that utilizes seabed nodes), a borehole orientation for the sensor as positioned in a borehole (e.g., as in a survey that utilizes a borehole) or a land surface orientation for the sensor positioned on land (e.g., as in a land based survey).

As an example, elastic properties can include P-wave and S-wave propagation quantities.

As an example, depth-dependent properties can include depth dependent velocities (e.g., P-wave velocity in water with respect to depth, etc.). In such an example, depth-dependent velocities can correspond to a first medium where the first medium and a second medium define an interface. As an example, information can be received that includes depth-dependent property information. From such information, for a survey, one or more velocities may be estimated (e.g., a velocity at a sensor such as a seabed sensor, etc.).

As an example, horizontal slowness can corresponds to a horizontal slowness associated with a wave impinging an interface between a first medium and a second medium (e.g., an interface defined by the first and second media).

As an example, a method can include calculating vertical slowness in a second medium of a first and second media. In such an example, the first medium may be a medium in which a source is located that can emit seismic energy (e.g., wave energy) that can be transmitted, at least in part, through the first medium to the second medium via the interface. In such an example, as in Snell's law, a portion may be transmitted and a portion reflected where such transmission and reflection can depend on various factors, including information associated with each of the media.

As an example, a method can include calculating an angle of incidence in a first medium proximate to an interface between the first medium and a second medium. In such an example, the media may be acoustic media. As an example, a medium may be isotropic or a medium may be anisotropic.

As an example, a method can include, based on at least a portion of information that includes sensor data, estimating a polarization angle in a second medium proximate to an interface between the second medium and the first medium. As mentioned, a source of seismic energy (e.g., wave energy) may be disposed in or adjacent to (e.g., in contact with) a medium such that energy can be transmitted therethrough toward another medium where an interface exists between the two media. As an example, a sensor (e.g., a seismic sensor) may be present at the interface (e.g., in contact with both media).

As an example, a method can include calculating vertical slowness in one of two media, calculating an angle of incidence in the other one of the two media, and, based at least in part on the vertical slowness and the angle of incidence, calculating orientation of a sensor that is positioned at an interface between the two media. In such an example, the method can include estimating a polarization angle in one of two media corresponding to the calculated vertical slowness. In such an example, calculations can be based at least in part on data acquired by the sensor.

As an example, calculating an orientation of a sensor can include imposing boundary conditions associated with an interface between two media where the sensor is positioned at the interface between the two media (e.g., in a borehole against a borehole wall, on a seabed, etc.).

As an example, an interface can be a fluid-solid interface, a solid-solid interface or an air-solid interface.

As an example, a system can include a processor; memory operatively coupled to the processor; and processor-executable instructions stored in the memory to instruct the system to: receive information associated with an interface between a first medium and a second medium where the information includes sensor data; based on at least a portion of the information, estimate wave properties that include elastic properties, depth-dependent properties and horizontal slowness; and based on the estimated wave properties, calculate an orientation of a sensor utilized to acquire at least a portion of the sensor data. In such an example, the orientation of the sensor can be a seabed orientation for the sensor as positioned on a seabed, a borehole orientation for the sensor as positioned in a borehole or a land surface orientation for the sensor positioned on land.

As an example, one or more computer-readable storage media can include processor-executable instructions to instruct a computing system to: receive information associated with an interface between a first medium and a second medium where the information includes sensor data; based on at least a portion of the information, estimate wave properties that include elastic properties, depth-dependent properties and horizontal slowness; and based on the estimated wave properties, calculate an orientation of a sensor utilized to acquire at least a portion of the sensor data. In such an example, the orientation of the sensor can be a seabed orientation for the sensor as positioned on a seabed, a borehole orientation for the sensor as positioned in a borehole or a land surface orientation for the sensor positioned on land.

Figure 12:
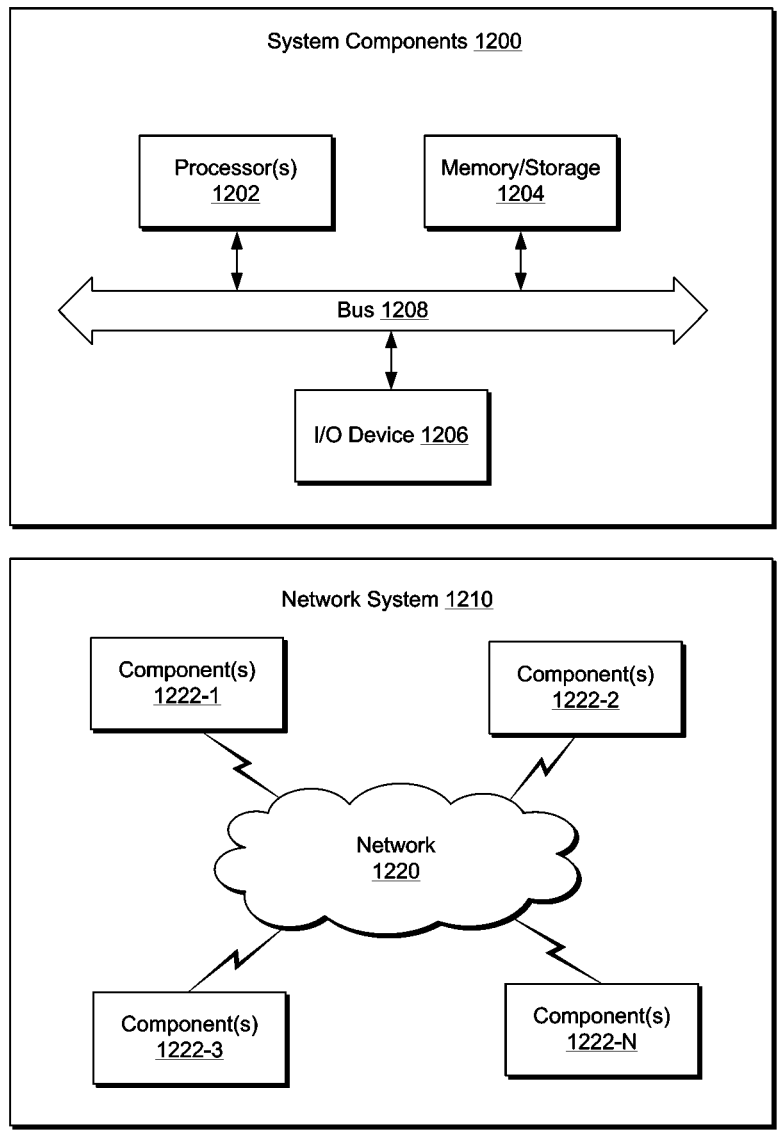
FIG. 12 illustrates example components of a system and a networked system.

FIG. 12 shows components of an example of a computing system 1200 and an example of a networked system 1210. The system 1200 includes one or more processors 1202, memory and/or storage components 1204, one or more input and/or output devices 1206 and a bus 1208. In an example embodiment, instructions may be stored in one or more computer-readable media (e.g., memory/storage components 1204). Such instructions may be read by one or more processors (e.g., the processor(s) 1202) via a communication bus (e.g., the bus 1208), which may be wired or wireless. The one or more processors may execute such instructions to implement (wholly or in part) one or more attributes (e.g., as part of a method). A user may view output from and interact with a process via an I/O device (e.g., the device 1206). In an example embodiment, a computer-readable medium may be a storage component such as a physical memory storage device, for example, a chip, a chip on a package, a memory card, etc. (e.g., a computer-readable storage medium).

In an example embodiment, components may be distributed, such as in the network system 1210. The network system 1210 includes components 1222-1, 1222-2, 1222-3, . . . 1222-N. For example, the components 1222-1 may include the processor(s) 1202 while the component(s) 1222-3 may include memory accessible by the processor(s) 1202. Further, the component(s) 1202-2 may include an I/O device for display and optionally interaction with a method. The network may be or include the Internet, an intranet, a cellular network, a satellite network, etc.

As an example, a device may be a mobile device that includes one or more network interfaces for communication of information. For example, a mobile device may include a wireless network interface (e.g., operable via IEEE 802.11, ETSI GSM, BLUETOOTH®, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

As an example, a system may be a distributed environment, for example, a so-called "cloud" environment where various devices, components, etc. interact for purposes of data storage, communications, computing, etc. As an example, a device or a system may include one or more components for communication of information via one or more of the Internet (e.g., where communication occurs via one or more Internet protocols), a cellular network, a satellite network, etc. As an example, a method may be implemented in a distributed environment (e.g., wholly or in part as a cloud-based service).

As an example, information may be input from a display (e.g., consider a touchscreen), output to a display or both. As an example, information may be output to a projector, a laser device, a printer, etc. such that the information may be viewed. As an example, information may be output stereographically or holographically. As to a printer, consider a 2D or a 3D printer. As an example, a 3D printer may include one or more substances that can be output to construct a 3D object. For example, data may be provided to a 3D printer to construct a 3D representation of a subterranean formation. As an example, layers may be constructed in 3D (e.g., horizons, etc.), geobodies constructed in 3D, etc. As an example, holes, fractures, etc., may be constructed in 3D (e.g., as positive structures, as negative structures, etc.).

Although only a few example embodiments have been described in detail above, those skilled in the art will readily appreciate that many modifications are possible in the example embodiments. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words "means for" together with an associated function.

BIBLIOGRAPHY (DOCUMENTS INCORPORATED BY REFERENCE HEREIN)

Boiero, D., Wiarda, E., and Vermeer, P., 2013, Surface- and guided-wave inversion for near-surface modeling in land and shallow marine seismic data. The Leading Edge, 32, 638-646.

Dellinger, J., Clarke, R., and Gutowski, P., 2001, Horizontal vector infidelity correction by general linear transform, 71st Ann. Internat. Mtg., Soc. of Expl. Geophys., 865-868.

Gaiser, J. E., 1999, Applications for vector coordinate systems of 3-D converted wave data, Leading Edge, 18, 1290-1300.

Kanasewich, E. R., 1981. Time sequence analysis in geophysics, University of Alberta Press, Edmonton.

Krieger, L. and Grigoli, F., 2015, Optimal reorientation of geophysical sensors: a quaternion-based analytical solution, Geophysics, 80, F19-F30.

Rajan, S. D. G. V. Frisk, K. M. Becker, J. F. Lynch, G. Potty and J. H. Miller, 2008, Modal inverse techniques for inferring geoacoustic properties in shallow water. Important Elements in: Geoacoustic Inversion, Signal Processing, and Reverberation in Underwater Acoustics, 2008: 165-234.

Shtivelman, V., 2004, Estimating shear wave velocities below the sea bed using surface waves. Near Surface Geophysics, 2, 241-247.

Strobbia, C., Laake, A., Vermeer, P., and Glushchenko, A., 2011, Surface waves: use them then lose them. Surface-wave analysis, inversion and attenuation in land reflection seismic surveying. Near Surface Geophysics, 9, 503-514.

What is claimed is:

1. A method to calculate an orientation of a multicomponent seismic sensor comprising:
   receiving information associated with an interface between a first elastic medium and a second elastic medium wherein the information comprises sensor data acquired by the multicomponent seismic sensor;
   based on at least a portion of the information, estimating seismic wave properties that comprise elastic properties, depth-dependent properties and horizontal slowness, wherein the depth-dependent properties are determined by:
      calculating vertical slowness in the first elastic medium;
      estimating a polarization angle of an incident seismic wave in the first elastic medium corresponding to the calculated vertical slowness; and
      calculating an angle of incidence in the second elastic medium; and
   based on the vertical slowness in the first elastic medium, the polarization angle of the incident seismic wave in the first elastic medium, and the angle of incidence in the second elastic medium, calculating an orientation of the multicomponent seismic sensor.

2. The method of claim 1 wherein the orientation of the multicomponent seismic sensor comprises a seabed orientation for the sensor as positioned on a fluid-solid interface formed by a seabed, wherein a subsea formation below the seabed forms the first elastic medium and seawater forms the second elastic medium.

3. The method of claim 1 wherein the orientation of the multicomponent seismic sensor comprises a borehole orientation for the sensor as positioned in a borehole.

4. The method of claim 1 wherein the orientation of the multicomponent seismic sensor comprises a land surface orientation for the sensor positioned on land.

5. The method of claim 1 wherein the elastic properties comprise P-wave and S-wave propagation quantities.

6. The method of claim 1 wherein the depth-dependent properties comprise depth dependent velocities.

7. The method of claim 6 wherein the depth-dependent velocities correspond to the first elastic medium.

8. The method of claim 6 wherein the information comprises depth-dependent property information.

9. The method of claim 1 wherein the horizontal slowness corresponds to a horizontal slowness associated with a wave impinging the interface.

10. The method of claim 1 comprising, based on at least a portion of the information, estimating a polarization angle in the second medium proximate to the interface.

11. The method of claim 1 wherein the interface comprises one of a fluid-solid interface, a solid-solid interface and an air-solid interface.

12. A system comprising:
a processor;
memory operatively coupled to the processor; and
processor-executable instructions stored in the memory to instruct the system to:
  receive information associated with an interface between a first elastic medium and a second elastic medium wherein the information comprises sensor data acquired by a multicomponent seismic sensor;
  based on at least a portion of the information, estimate seismic wave properties that comprise elastic properties, depth-dependent properties and horizontal slowness, wherein the depth-dependent properties are determined by:
    calculating vertical slowness in the first elastic medium;
    estimating a polarization angle of an incident seismic wave in the first elastic medium corresponding to the calculated vertical slowness; and
    calculating an angle of incidence in the second elastic medium; and
  based on the vertical slowness in the first elastic medium, the polarization angle of the incident seismic wave in the first elastic medium, and the angle of incidence in the second elastic medium, calculate an orientation of the multicomponent seismic sensor.

13. The system of claim 12 wherein the orientation of the sensor comprises a seabed orientation for the sensor as positioned on a seabed, a borehole orientation for the sensor as positioned in a borehole or a land surface orientation for the sensor positioned on land.

14. One or more non-transitory computer-readable storage media comprising processor-executable instructions to instruct a computing system to:
  receive information associated with an interface between a first elastic medium and a second elastic medium wherein the information comprises sensor data acquired by a multicomponent seismic sensor;
  based on at least a portion of the information, estimate seismic wave properties that comprise elastic properties, depth-dependent properties and horizontal slowness, wherein the depth-dependent properties are determined by:
    calculating vertical slowness in the first elastic medium;
    estimating a polarization angle of an incident seismic wave in the first elastic medium corresponding to the calculated vertical slowness; and
    calculating an angle of incidence in the second elastic medium; and
  based on the vertical slowness in the first elastic medium, the polarization angle of the incident seismic wave in the first elastic medium, and the angle of incidence in the second elastic medium, calculate an orientation of the multicomponent seismic sensor.

15. The one or more non-transitory computer-readable storage media of claim 14 wherein the orientation of the sensor comprises a seabed orientation for the sensor as positioned on a seabed, a borehole orientation for the sensor as positioned in a borehole or a land surface orientation for the sensor positioned on land.

* * * * *